US008773566B2

(12) United States Patent
Wang et al.

(10) Patent No.: US 8,773,566 B2
(45) Date of Patent: Jul. 8, 2014

(54) PHOTOGRAPHING CONDITION SETTING APPARATUS, PHOTOGRAPHING CONDITION SETTING METHOD, AND PHOTOGRAPHING CONDITION SETTING PROGRAM

(75) Inventors: QiHong Wang, Tokyo (JP); Akiko Terayama, Tokyo (JP); Shunichi Kasahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 277 days.

(21) Appl. No.: 12/817,679

(22) Filed: Jun. 17, 2010

(65) Prior Publication Data
US 2011/0050915 A1    Mar. 3, 2011

(30) Foreign Application Priority Data

Aug. 31, 2009 (JP) ................................. 2009-200160

(51) Int. Cl.
H04N 5/222 (2006.01)
H04N 5/262 (2006.01)

(52) U.S. Cl.
USPC ..................................... 348/333.02; 348/239

(58) Field of Classification Search
USPC .................. 348/239, 333.02, 333.03, 333.04, 348/333.12
See application file for complete search history.

(56) References Cited

U.S. PATENT DOCUMENTS

| | | | |
|---|---|---|---|
| 7,602,993 B2* | 10/2009 | Nishiyama | 382/282 |
| 7,978,248 B2* | 7/2011 | Terashima | 348/333.05 |
| 8,072,505 B2* | 12/2011 | Sugita et al. | 348/333.02 |
| 8,149,313 B2* | 4/2012 | Watanabe et al. | 348/333.02 |
| 2003/0026607 A1* | 2/2003 | Okisu et al. | 396/213 |
| 2006/0192879 A1* | 8/2006 | Hisamatsu | 348/333.01 |
| 2007/0065137 A1* | 3/2007 | Hara et al. | 396/291 |
| 2009/0040324 A1* | 2/2009 | Nonaka | 348/333.01 |
| 2009/0059054 A1* | 3/2009 | Oishi et al. | 348/333.11 |
| 2009/0066803 A1* | 3/2009 | Miyata | 348/222.1 |
| 2010/0110266 A1* | 5/2010 | Lee et al. | 348/333.02 |
| 2010/0157084 A1* | 6/2010 | Shimamura et al. | 348/222.1 |
| 2011/0096195 A1* | 4/2011 | Nagoya | 348/333.02 |
| 2011/0242395 A1* | 10/2011 | Yamada et al. | 348/333.02 |
| 2012/0075500 A1* | 3/2012 | Kaneda et al. | 348/231.6 |

(Continued)

FOREIGN PATENT DOCUMENTS

| | | |
|---|---|---|
| CN | 1522052 A | 8/2004 |
| CN | 101115148 A | 1/2008 |

(Continued)

OTHER PUBLICATIONS

Chinese Office Action issued Jul. 4, 2012, in China Patent Application No. 201010241805.7 (with English translation).

(Continued)

Primary Examiner — John Villecco
(74) Attorney, Agent, or Firm — Oblon, Spivak, McClelland, Maier & Neustadt, L.L.P.

(57) ABSTRACT

Provided is a photographing condition setting apparatus including: a display unit; an image capturing unit which generates image data by capturing a photographing object; a photographing situation determination unit which determines based on the image data generated by the image capturing unit which type of the photographing object is photographed in a photographing situation; and a display controller which displays on the display unit one or a plurality of photographing condition icons indicating the photographing condition settable to the determined photographing situation if the photographing situation is determined by the photographing situation determination unit.

9 Claims, 8 Drawing Sheets

(56) References Cited

U.S. PATENT DOCUMENTS

| | | | |
|---|---|---|---|
| 2012/0086834 A1* | 4/2012 | Adachi | 348/239 |
| 2012/0105676 A1* | 5/2012 | Park | 348/239 |
| 2012/0236162 A1* | 9/2012 | Imamura | 348/207.99 |
| 2013/0010170 A1* | 1/2013 | Matsuzawa et al. | 348/333.01 |

FOREIGN PATENT DOCUMENTS

| | | | |
|---|---|---|---|
| JP | 2003-274280 A | | 9/2003 |
| JP | 2003-348519 | | 12/2003 |
| JP | 2007-27945 A | | 2/2007 |
| JP | 2007-67560 | | 3/2007 |
| JP | 2008-104069 A | | 5/2008 |
| JP | 2009146343 A | * | 7/2009 |
| JP | 2010273166 A | * | 12/2010 |
| JP | 2010273167 A | * | 12/2010 |
| WO | WO 2008/142478 A1 | | 11/2008 |

OTHER PUBLICATIONS

Office Action issued Jun. 25, 2013 in Japanese Patent Application No. 2009-200160.

* cited by examiner

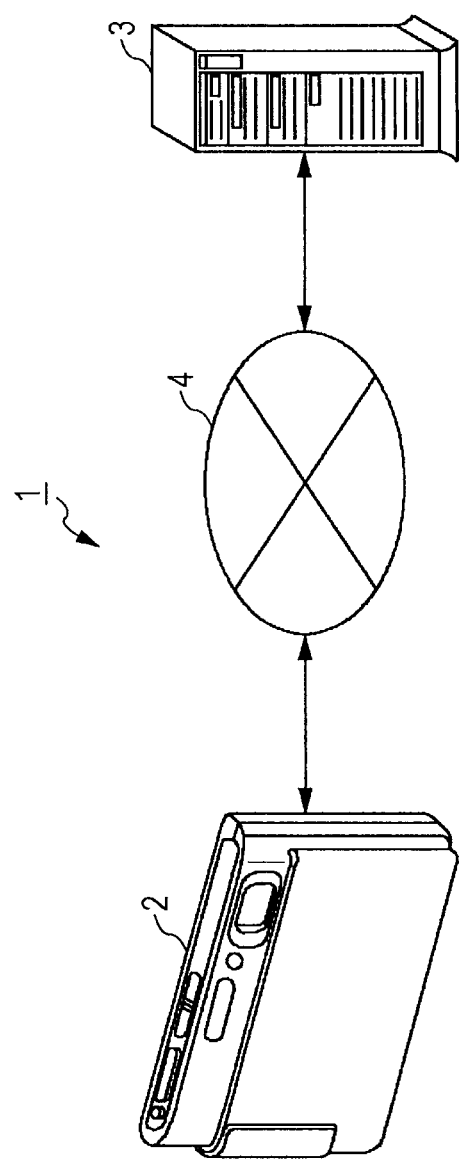

PHOTOGRAPHING CONDITION SETTING APPARATUS, PHOTOGRAPHING CONDITION SETTING METHOD, AND PHOTOGRAPHING CONDITION SETTING PROGRAM

BACKGROUND OF THE INVENTION

1. Field of the Present Invention

The present invention relates to a photographing condition setting apparatus, a photographing condition setting method, and a photographing condition setting program, and more particularly, to a photographing condition setting apparatus, a photographing condition setting method, and a photographing condition setting program capable of being appropriately used for a photographing system configured with, for example, a digital still camera and a photographing condition providing apparatus.

2. Description of the Related Art

In an image capturing system in the related art, at the time of photographing a photographing object, a digital camera transmits current position information (latitude and longitude) acquired by a GPS (Global Positioning System) module to a server apparatus.

In the image capturing system, if the server apparatus receives the current position information transmitted from the digital camera, the server apparatus searches for a plurality of best shot images corresponding to the current position information from a database and transmits to the digital camera.

If the digital camera receives the plurality of the best shot images transmitted from the server apparatus, the digital camera narrows the plurality of the best shot images down to a plurality of the best shot images corresponding to the current date and time, weather, and the direction of the optical lens of the digital camera.

In addition, the digital camera recommends the plurality of the narrowed-down best shot images to a user. If a desired best shot image is selected, the digital camera displays the selected best shot image to a display unit.

In addition, the digital camera sets control information added to the selected best shot image, which indicates a photographing condition for obtaining an image equivalent to the best shot image, to an image process circuit or a controller.

Therefore, the digital camera allows the best shot image displayed on the display unit to be referred to and allows the shutter key to be manipulated so that the photographing range becomes the best shot image in the digital camera.

In this manner, the digital camera photographs, for example, a building in a sightseeing place so that a previous photograph may be reproduced and generates and records an image having a composition or color tone equivalent to the best shot image or the like (for example, refer to Pages. 4, 5, and 6 and FIG. 6 of Japanese Unexamined Patent Application Publication No. 2003-348519).

However, in the image capturing system having such a configuration, the digital camera is used for photographing a person as an object as well as for photographing the building as an object.

In the image capturing system, the best shot image corresponding to the current position of the digital camera is only transmitted from the server apparatus to the digital camera. The image capturing system recommends the photographing condition, which may be selected in order to photograph the building at the current position, as the best shot image that may be obtained based on the photographing condition to the user by using the digital camera.

For this reason, in some cases, the image capturing system may recommend the photographing condition for photographing the building in the photographing situation where the person as a photographing object is photographed as well as in the photographing situation where the building as a photographing object is photographed by the digital camera.

Therefore, there is a problem in that the image capturing system may not recommend to the user of the digital camera the photographing condition suitable for the photographing situation according to the photographing situation where the building as a photographing object is photographed or the photographing situation where the person as a photographing object is photographed and may not appropriately set.

SUMMARY OF THE INVENTION

It is desirable to provide a photographing condition setting apparatus, a photographing condition setting method, and a photographing condition setting program capable of appropriately setting a desired photographing condition suitable for a photographing situation.

According to an embodiment of the invention, image data is generated by capturing a photographing object, it is determined based on the generated image data which type of the photographing object is photographed in a photographing situation, and one or a plurality of photographing condition icons indicating photographing conditions settable to the determined photographing situation are displayed on a display unit.

Therefore, in the invention, it is possible to allow the photographing condition suitable for the photographing situation to be selected as the photographing condition icon according to the photographing situation.

According to the invention, image data is generated by capturing a photographing object, it is determined based on the generated image data which type of the photographing object is photographed in a photographing situation, and one or a plurality of photographing condition icons indicating photographing conditions settable to the determined photographing situation are displayed on a display unit. Therefore, it is possible to allow the photographing condition suitable for the photographing situation to be selected as the photographing condition icon according to the photographing situation, so that it is possible to implement a photographing condition setting apparatus, a photographing condition setting method, and a photographing condition setting program capable of appropriately setting the desired photographing condition suitable for the photographing situation.

BRIEF DESCRIPTION OF THE DRAWINGS

FIG. 1 is a schematic diagram illustrating an embodiment of the entire configuration of a photographing system according to the invention.

DESCRIPTION OF THE PREFERRED EMBODIMENTS

Figure 2A:
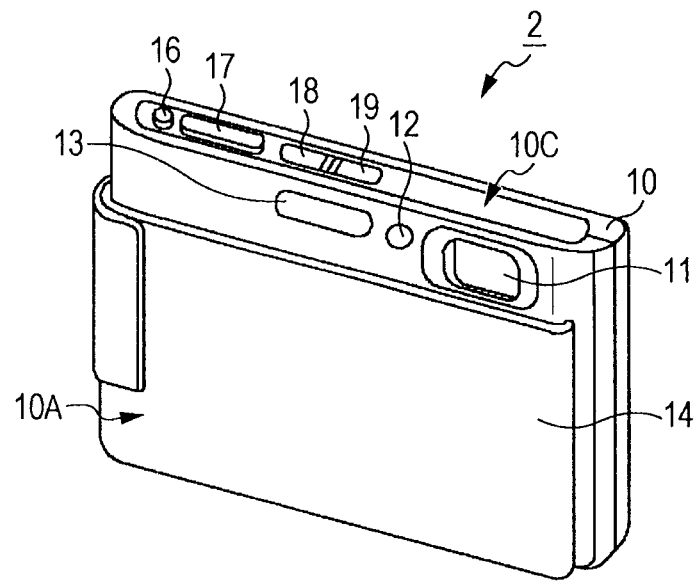
FIGS. 2A and 2B are schematic diagrams illustrating a configuration of the outer appearance of a digital still camera.

Hereinafter, the best modes (hereinafter, referred to as embodiments) carrying out the invention will be described. The description is made in the following order.

1. Embodiments
2. Modified Examples

1. EMBODIMENTS

1-1. Entire Configuration of Photographing System

In FIG. 1, reference numeral 1 denotes a photographing system to which the invention is adapted as a whole. In the photographing system 1, a digital still camera 2 recommends to a user one or a plurality of photographing conditions that are settable for photographing a person, for example, in the case of photographing a person as a photographing object.

In the photographing system 1, the digital still camera 2 is configured to set the photographing condition selected by the user among the recommended one or plurality of the photographing conditions and to photograph a person.

In the hereinafter description, a photographing situation of photographing a person as a photographing object is particularly referred to as a person photographing situation. In addition, in the hereinafter description, a condition for photographing a person, which is settable to the person photographing situation, is particularly referred to as a person photographing condition.

In the photographing system 1, a photographing condition providing apparatus 3 acquires from a number of users picture images that are obtained by photographing artificial objects such as buildings and exhibited objects or natural objects such as mountains, rivers, and seas together with photographing conditions of the picture images. In the hereinafter description, an artificial object or a natural object as a photographing object (photographing object) other than a person is collectively referred to as a non-human object.

In the photographing system 1, in the case of the photographing situation where the non-human object as a photographing object is photographed, the digital still camera 2 communicates with the photographing condition providing apparatus 3 through a network 4 such as the Internet.

Therefore, in the photographing system 1, the photographing condition providing apparatus 3 provides to the digital still camera 2 one or the plurality of the photographing conditions settable for photographing the non-human object, and thus the digital still camera 2 recommends one or the plurality of the photographing conditions to the user.

In the photographing system 1, the digital still camera 2 is configured to set the photographing condition selected by the user among one or the plurality of the photographing conditions recommended to the user so as to photograph the non-human object.

In the hereinafter description, the photographing situation where the non-human object as a photographing object is photographed is particularly referred to as a non-human object photographing situation. In addition, in the hereinafter description, the photographing condition for photographing the non-human object, which is settable for the non-human object photographing situation, is particularly referred to as a non-human object photographing condition.

1-2. Configuration of the Outer Appearance of Digital Still Camera 2

Figure 2B:
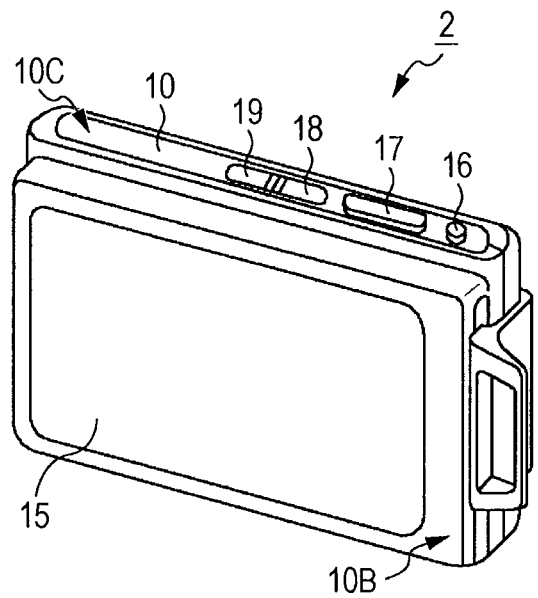

Next, a configuration of the outer appearance of the digital still camera 2 is described with reference to FIGS. 2A and 2B. The digital still camera 2 has a case 10 having a substantially flat rectangular shape, of which the size is the extent to which the digital still camera 2 is gripped by one hand.

In the front surface 10A of the case 10, in the upper portion thereof, a photographing lens 11, an auto focus (AF) illuminator 12, and a flash 13 are provided. The auto focus illuminator 12 is also used as a self timer lamp.

In addition, in the front surface 10A, a lens cover 14 is mounted so that the lens cover 14 may slide in the up and down directions. Therefore, in the case where the lens cover 14 slides in the down direction, the photographing lens 11, the auto focus illuminator 12, and the flash 13 in the case 10 are exposed.

In addition, in the case where the lens cover 14 slides in the up direction, the photographing lens 11, the auto focus illuminator 12, and the flash 13 in the case 10 are covered so as to be protected from the external environment. In addition, when the lens cover 14 slides in the down direction in the state where the digital still camera 2 is powered off, the digital still camera 2 is configured to be automatically powered on.

In the rear surface 10B of the case 10, a touch screen 15 is provided. The touch screen 15 is configured, for example, by adhering a touch panel on the surface of the display.

Therefore, the touch screen 15 functions as a display device capable of performing a touch manipulation on the display by using a finger, a stylus pen, or the like. The display may be configured, for example, as a liquid crystal display.

In addition, in the top surface 10O of the case 10, a zoom lever 16, a shutter button 17, a reproducing button 18, and a power button 19 are provided. The reproducing button 18 is a hardware key for changing an operation mode of the digital still camera 2 into a reproduction mode where a picture image is reproduced and displayed on the touch screen 15.

According to the configuration, if the lens cover 14 slides in the down direction or if the power button 10 is pressed, the digital still camera 2 is powered on, so that the digital still camera 2 starts at the photographing mode.

At the photographing mode, the digital still camera 2 consecutively photographs a photographing object through the photographing lens 11 so as to check photographing range or photographing states such composition or focus, generates photographing state recommendation images as a moving picture, and displays on the touch screen 15.

In addition, at this time, in response to a tilting manipulation to the zoom lever 16 or a touch manipulation to the touch screen 15, the digital still camera 2 performs zooming (TELE/WIDE). In this manner, the digital still camera 2 allows the user to check the photographing state of the photographing object through the photographing state recommendation images displayed on the touch screen 15.

In this state, if the shutter button 17 is pressed, the digital still camera 2 photographs the photographing object through the photographing lens 11 at this time and generates and records the picture image.

In addition, if the reproducing button 18 pressed, the digital still camera 2 proceeds from the photographing mode to the reproduction mode. At this time, the digital still camera 2 displays, for example, one of picture images, which are previously recorded, on the display. Next, in response to the touch manipulation on the touch screen 15, the digital still camera 2 changes the picture image which are displayed thereon.

In this manner, the digital still camera 2 is configured to photograph the photographing object and generate and records the picture image and to reproduce and display the recorded picture image.

1-3. Circuit Configuration of Digital Still Camera 2

Figure 3:
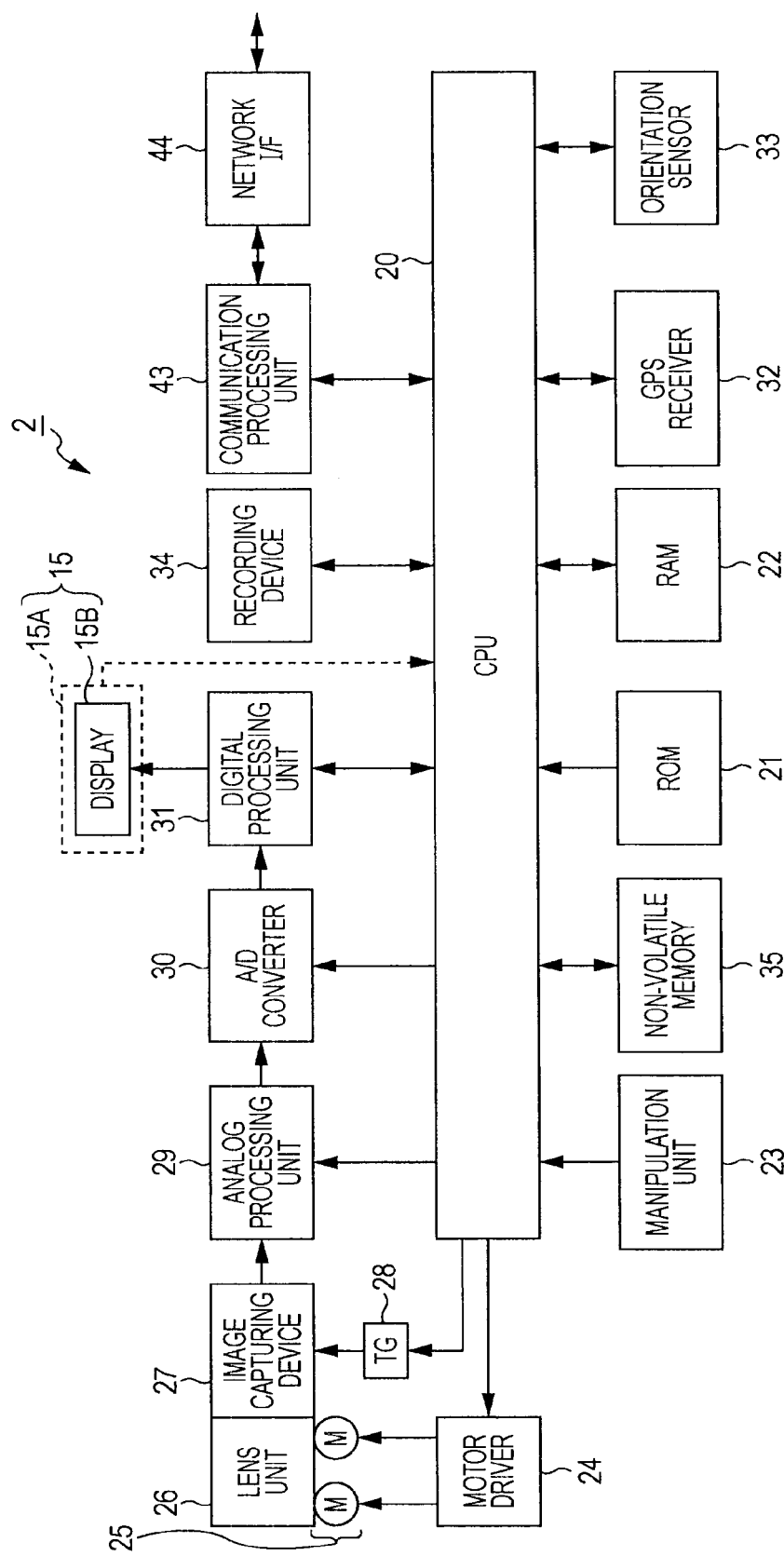
FIG. 3 is a block diagram illustrating a circuit configuration of a digital still camera.

Next, a circuit configuration of the digital still camera 2 is described with reference to FIG. 3. The digital still camera 2 includes a central processing unit (CPU) 20. In the hereinafter description, the central processing unit 20 included in the digital still camera 2 is particularly referred to as a camera controller 20.

The camera controller 20 reads various programs that are stored in a ROM (Read Only Memory) 21 in advance and develops the programs on a RAM (Random Access Memory) 22. Next, the camera controller 20 controls the entire digital still camera 2 according to the various programs developed on the RAM 22.

In addition, the camera controller 20 performs various processes in response to an input signal, which is input from the touch panel 15A of the touch screen 15 according to a touch manipulation, through the various programs developed on the RAM 22.

In addition, the camera controller 20 also performs various processes in response to an input signal, which is input from the manipulation unit 23 according to a pressing manipulation or the like, through the various programs developed on the RAM 22.

Actually, if an arbitrary position of the surface of the touch panel 15A is touched with the finger or the like, a coordinate (that is, a touch position) of the touched position is detected every a very short constant time during the time when the surface is touched with the finger or the like. The touch panel 15A transmits to the camera controller 20 an input signal indicating the coordinate of the touch position detected during the time when the surface is touched with the finger or the like.

If the input signal is input from the touch panel 15A, the camera controller 20 detects presence or absence of change in the touch position and a duration time of touch (hereinafter, referred to as a touch duration time) based on the input signal. Next, the camera controller 20 identifies the type of the touch manipulation based on the detection result for the presence or absence of change in the touch position and the touch continuing time.

As a result, if the touch position is not substantially changed and if the touch continuing time is equal to or less than a relatively short predetermined time, the camera controller 20 identifies the touch manipulation at this time as a touch manipulation of allowing the finger or the like to be in contact with an arbitrary point of the surface of the touch panel 15A and to be immediately detached therefrom.

In addition, in the hereinafter description, the touch manipulation of allowing the finger or the like to be in contact with an arbitrary point of a surface of the touch panel 15A and to be immediately detached therefrom is particularly referred to as a tapping manipulation. The tapping manipulation is a manipulation performed to indicate a button, an icon, or the like in the image displayed on the display 15B and to input a command allocated to the indicated button, icon, or the like.

In addition, the touch position is changed for a touch continuing time longer than a predetermined time, the camera controller 20 identifies the touch manipulation at this time as a touch manipulation of moving the finger or the like while allowing the fingers or the like to be in contact with the surface of the touch panel 15A.

In addition, in the hereinafter description, a touch manipulation of moving the finger or the like while allowing the finger or the like to be in contact with the surface of the touch panel 15A is particularly referred to as a sliding manipulation. The sliding manipulation is a manipulation performed to move (that is, drag) the icon or the like in the image displayed on the display 15B.

The camera controller 20 converts the coordinate of the touch position indicated by the input signal into the coordinate in the image displayed on the display 15B to detect which position is indicated in the image displayed on the display 15B.

Therefore, if the tapping manipulation is performed as a touch manipulation at this time, the camera controller 20 detects one point of the indicating position in the image. In addition, if the sliding manipulation is performed as a touch manipulation at this time, the camera controller 20 detects the movement trajectory of the indicating position in the image.

Accordingly, in this manner, if the camera controller 20 identifies the type of the touch manipulation and detects the one point of the indicating position or the movement trajectory of the indicating position, the camera controller 20 identifies the command input through the tapping manipulation or the sliding manipulation according to the identification result and the detection result. Next, if the command input through the tapping manipulation or the sliding manipulation is identified in this manner, the camera controller 20 performs a process corresponding to the identified command.

On the other hand, the manipulation unit 23 includes the aforementioned zoom lever 16, shutter button 17, reproducing button 18, and power button 19 and transmits the input signal to the camera controller 20 according to the press manipulation or the like.

If the input signal is input from the manipulation unit 23, the camera controller 20 determines based on the input signal which one of the zoom lever 16, the shutter button 17, the reproducing button 18, and the power button 19 is manipulated.

The camera controller 20 identifies the command input through the press manipulation at this time according to the determination result. Next, if the command input through the pressing manipulation or the like is identified in this manner, the camera controller 20 performs a process corresponding to the identified command.

In this manner, if the camera controller 20 is powered on, for example, by pressing the power button 19 of the manipulation unit 23 or if the camera controller 20 is instructed to change the operation mode into the photographing mode through the tapping manipulation on the touch panel 15A, the camera controller 20 operates in the photographing mode.

In the photographing mode, the camera controller 20 controls the driving of an actuator 25 through a motor driver 24 to adjust an aperture amount of an aperture, a position of a focus lens, or the like in a lens unit 26 including the aperture, the focus lens, or the like together with the aforementioned photographing lens 11. Accordingly, the camera controller 20 automatically adjusts the exposure or focus with respect to the photographing range.

In this state, the camera controller 20 receives image capturing light, which is originated from the photographing range including the photographing object, through the lens unit 26 at a light-receiving surface of an image capturing device 27. The image capturing device 27 may be configured as a CCD (Charge Coupled Device) image sensor or a CMOS (Complementary Metal Oxide Semiconductor) image sensor.

At this time, the camera controller 20 controls a timing generator 28. Accordingly, the timing generator 28 sequentially transmits a timing signal in a predetermined period (for example, a 1/30 [second] period) to the image capturing device 27.

The image capturing device 27 sequentially photoelectrically-converts the image capturing light received at the light-receiving surface at the input timing of the timing signal to generate an analog photoelectrically-converted signal corresponding to the image capturing light and transmits the generated photoelectrically-converted signal to an analog processing unit 29.

Every time when the photoelectrically-converted signal is input from the image capturing device 27, the analog processing unit 29 applies a predetermined analog process such as an amplification process on the photoelectrically-converted signal to generate an image capturing signal under the control of the camera controller 20.

In addition, every time when the image capturing signal is generated, the analog processing unit 29 converts the generated image capturing signal into digital image capturing data through an analog-digital converter 30 and transmits to a digital processing unit 31.

Every time when the image capturing data is input from the analog-digital converter 30, the digital processing unit 31 applies a predetermined digital process such as a noise reduction process on the image capturing data under the control of the camera controller 20.

Accordingly, the digital processing unit 31 generates unit image data for unit images, which are consecutive in time, constituting the aforementioned photographing state recommendation image based on the image capturing data that are sequentially input from the analog-digital converter 30.

Every time when the unit image data is generated, the camera controller 20 sequentially transmits the generated unit image data to the display 15B. Therefore, the digital processing unit 31 displays on the display 15B the photographing state recommendation image (that is, a moving picture) by sequentially changing the unit images based on the plurality of the unit image data which are consecutive in time.

In this manner, the camera controller 20 consecutively photographs the photographing range including the photographing object to display the photographing state recommendation image on the display 15B and allows the user to check the photographing state of the photographing object through the photographing state recommendation image before photographing the photographing object.

In this state, if the shutter button 17 is half-pushed by the user and if an input signal is input from the manipulation unit 23, the camera controller 20 recognizes that a focus adjusting command is input. At this time, the camera controller 20 controls the driving of the actuator 25 through the motor driver 24 in response to the input of the focus adjusting command. Therefore, the camera controller 20 adjusts the position of the focus lens in the lens unit 26 to automatically focus on the photographing object in the photographing range.

In addition, if the shutter button 17 is fully pressed by the user and if an input signal is input from the manipulation unit 23, the camera controller 20 recognizes that a photographing command is input. At this time, the camera controller 20 controls the timing generator 28 in response to the input of the photographing command to allow the light-receiving surface of the image capturing device 27 to be exposed by the image capturing light at a preset shutter speed for the photographing.

At this time, the image capturing device 27 photoelectrically-converts the image capturing light exposing the light-receiving surface to generate a photoelectrically-converted signal for photographing corresponding to the exposed image capturing light and transmits the generated photoelectrically-converted signal for photographing to the analog processing unit 29.

The analog processing unit 29 applies a predetermined analog process such as an amplification process on the photoelectrically-converted signal for photographing input from the image capturing device 27 to generate an image capturing signal for photographing. The analog processing unit 29 converts the image capturing signal for photographing into image capturing data for photographing through the analog-digital converter 30 and transmits to the digital processing unit 31.

At this time, the digital processing unit 31 applies a predetermined digital process for the photographing such as a noise reduction process or a shading correction process on the image capturing data for photographing input from the analog-digital converter 30. Therefore, the digital processing unit 31 generates the picture image data that are obtained by photographing the photographing range including the photographing object.

The digital processing unit 31 applies a compression encoding process on the picture image data to generate compressed image data in a predetermined compression encoding scheme such as a JPEG (Joint Photographic Experts Group) scheme.

At this time, the digital processing unit 31 also applies on the picture image data a reduction process for culling pixels to generate reduced picture image data (hereinafter, referred to as thumbnail data) of reduced picture images (hereinafter, referred to as thumbnails). Next, the digital processing unit 31 transmits the compressed image data together with the thumbnail data to the camera controller 20.

If the compressed image data and the thumbnail data are input from the digital processing unit 31, the camera controller 20 generates header data containing image-associated information on the picture images, for example, in accordance with Exif (Exchangeable image file format). Next, the camera controller 20 generates an image file by adding the header data to a header of the compressed image data.

When the compressed image data is input from the digital processing unit 31, the camera controller 20 generates identification information (for example, a file name) capable of individually identifying the image file generated based on the compressed image data. In addition, in the hereinafter description, the identification information capable of individually identifying the image file is referred to as file identification information.

In addition, the camera controller 20 is configured to detect the current position (position represented by latitude and longitude) of the digital still camera 2 by communicating with a GPS (Global Positioning System) satellite through a GPS receiver 32. In addition, in the hereinafter description, the current position of the digital still camera 2, which is detected by using GPS, is referred to as a camera position.

If the photographing command is input in the photographing mode, the camera controller 20 detects the current camera position by using the GPS at the input time, particularly, as a photographing position at the time of photographing the photographing object.

In addition, the camera controller 20 is also configured to detect the current orientation (that is, an orientation represented by East, West, South, and North) directed by the photographing lens 11 (that is, the incident surface of the image capturing light) of the digital still camera 2 by using an orientation sensor 33.

In addition, in the hereinafter description, the current orientation directed by the photographing lens 11 of the digital video camera 2, which is detected by the orientation sensor 33, is referred to as a camera direction. If the photographing command is input in the photographing mode, the camera controller 20 detects the current camera direction by using the orientation sensor 33 at the input time, particularly, as the photographing direction at the time of photographing the photographing object.

In addition, the camera controller 20 counts current date and time by using an internal timer. If the photographing command is input, the camera controller 20 detects the date and time at the input time and sets the detected date and time as the photographing date and time of photographing the photographing object.

Therefore, when the image file is generated, the camera controller 20 allows the header data added to the header of the compressed image data to contain the file identification information or the photographing position information indicating the photographing position as the image-associated information.

At this time, the camera controller 20 also allow the header data to contain the photographing direction information indicating the photographing direction, the photographing date and time information indicating the photographing date and time, the condition setting information (that is, the information indicating the photographing condition) used for the photographing, or the like as the image associated information.

If the image file is generated in this manner, the camera controller 20 transmits the generated image file together with the thumbnail data to a recording device 34, so that the image file and the thumbnail data are recorded in a correspondence manner in the recording device 34. Therefore, the camera controller 20 allows the user to photograph the photographing object and allows the obtained picture image data to be recorded as the image file.

The recording device 34 may be a non-volatile memory of about several Giga-bites to several tens of Giga-bites, which is built in the digital still camera 2 in advance or, similarly to a memory card, detachable provided to the digital still camera 2.

In the case 10 of the digital still camera 2, a recommendation request button for requesting a recommendation of the person photographing condition or the non-human object photographing condition that is settable according to the person photographing situation or the non-human object photographing situation is disposed on the side surface or the bottom surface.

In the photographing mode, if an input signal is input from the manipulation unit 23 through the user's manipulation of the recommendation request button, the camera controller 20 recognizes that a photographing condition recommendation command is input. At this time, the camera controller 20 performs a photographing condition recommendation setting process for recommending the settable photographing condition to the user.

In this case, every time when the unit image data is generated, the camera controller 20 controls the digital processing unit 31 to perform a face detection process for detecting whether or not a face of the person is shown on the unit image based on the unit image data.

The digital processing unit 31 maintains feature amounts (expressed by a form or color of a face or forms or the like of eyes, nose, mouth, and eyebrows) of a face of a man, which are obtained by analyzing images of faces of a number of mans (that is, adult mans) and learning based on the analysis result, as man face feature amounts.

In addition, the digital processing unit 31 maintains feature amounts (expressed by a form or color of a face or forms or the like of eyes, nose, mouth, and eyebrows) of a face of a woman, which are obtained by analyzing images of faces of a number of women (that is, adult women) and learning based on the analysis result, as woman face feature amounts.

In addition, the digital processing unit 31 maintains feature amounts (expressed by a form or color of a face or forms or the like of eyes, nose, mouth, and eyebrows) of a face of a boy, which are obtained by analyzing images of faces of a number of boys (that is, young boys) and learning based on the analysis result, as boy face feature amounts.

In addition, the digital processing unit 31 maintains feature amounts (expressed by a form or color of a face or forms or the like of eyes, nose, mouth, and eyebrows) of a face of a girl, which are obtained by analyzing images of faces of a number of girls (that is, young girls) and learning based on the analysis result, as girl face feature amounts.

In addition, in the hereinafter description, in the case where it is not necessary to distinguish the adult man, the adult woman, the young boy, and the young girl from each other, the adult man, the adult woman, the young boy, and the young girl is collectively referred to as a person. In addition, in the hereinafter description, in the case where it is not necessary to distinguish the man face feature amount, the woman face feature amount, the boy face feature amount, and the girl face feature amount from each other, the man face feature amount, the woman face feature amount, the boy face feature amount, and the girl face feature amount are collectively referred to as a face feature amount.

In addition, the digital processing unit 31 displays a general luminance distribution of the face of the person and a general structural pattern of the face and maintains face searching information for searching an area (hereinafter, referred to as an estimated area) estimated that the face of the person is shown in the unit image in advance.

Therefore, every time when the unit image data is generated for the display of the photographing state recommendation image, the digital processing unit 31 performs the face detection process for detecting by using the face searching information and the face feature amount whether or not the person is shown in the unit image based on the unit image data.

Actually, every time when the unit image data is generated, the digital processing unit 31 searches for the estimated area in the unit image, which is based on the unit image data, based on the face searching information. As a result, if one or a plurality of the estimated areas are detected in the unit image, the digital processing unit 31 extracts from the estimated areas, for example, forms of a plurality of contours, a position relationship between the plurality of contours, and colors as an image feature amount of an image (hereinafter, referred to as an estimated area feature amount).

In addition, the digital processing unit 31 sequentially compares the estimated area feature amount with the man face feature amount, the woman face feature amount, the boy face feature amount, and the girl face feature amount and detects based on the comparison result whether or not a face of each person is shown in one or the plurality of the estimated areas of the unit image.

In other words, in this manner, with respect to one or the plurality of the estimated areas of the unit image, the digital processing unit 31 detects whether or not any one of man's face, woman's face, boy's face, and girl's face is shown.

As a result, if it is detected that a person's face (that is, a man's face, a woman's face, a boy's face, or a girl's face) is shown in the estimated area, the digital processing unit 31 further specifies mouth, eyes, or the like in the detected person's face based on the estimated area feature amount and the face feature amount.

In addition, the digital processing unit 31 specifies the person's face and detects based on the form of the mouth, eyes, or the like whether or not the face is a smile face. Next, with respect to each estimated area where the person's face is shown, the digital processing unit 31 generates the face detection information indicating the face detected from the estimated area.

At this time, the digital processing unit 31 inserts into the face detection information of each estimated area the area position information indicating the position of the estimated area (the estimated area where the person's face is shown) in the unit image. In addition, the digital processing unit 31 also inserts into the face detection information of each estimated area the face type information indicating the type (that is, man or woman (gender) and adult or young persons) of the person, of which the face is shown in the estimated area.

In addition, the digital processing unit 31 also inserts into the face detection information of each estimated area the facial expression information indicating whether or not the person's face, which is shown in the estimated area, is a smile face. Next, the digital processing unit 31 transmits the face detection information of each estimated area to the camera controller 20.

In this manner, if the camera controller 20 starts the photographing condition recommendation setting process, every time when the unit image data is generated, the digital processing unit 31 performs the face detection process. If the person's face is detected in the face detection process, the digital processing unit 31 transmits the face detection information to the camera controller 20.

A non-volatile memory 35 for storing various types of information indicating the setting contents set by the user with respect to various setting items or information or the like that are necessary to be maintained after power off is connected to the camera controller 20.

The non-volatile memory 35 is an EEPROM (Electrically Erasable Programmable Read Only Memory), an MRAM (Magneto-resistive Random Access Memory), or the like.

A plurality of the photographing condition icons indicating (that is, recommending to the user) various settable person photographing conditions, which are to be individually adapted to the person at the time of photographing the person, are stored in the non-volatile memory 35 in advance.

In addition, the condition setting information used for setting the person photographing conditions in correspondence with the photographing condition icons indicating the person photographing conditions is stored in the non-volatile memory 35. In addition, in the hereinafter description, a photographing condition icon for recommending a person photographing condition to a user is referred to as a person photographing condition icon.

As a person photographing condition, there is a blink avoidance photographing where the person is photographed consecutively twice at an automatically increasing shutter speed and one picture image where the person is shown without the his eyes closed is recorded in order to avoid the person with his eyes closed due to eye blinking from being photographed and to avoid the picture image from being recorded.

In addition, as a person photographing condition, there is a smile face waiting photographing where, in the case where the person dose not show a smile face, if the person shows a smile face, the person is automatically photographed. In addition, as a person photographing condition, there is also a turning-around waiting photographing where, when a person dislikes to face the photographing lens 11 (when the same type of faces are repeatedly detected and non-detected at the substantially same position of consecutive unit images), if the person faces, the picture is automatically photographed.

In addition, as a person photographing condition, there is a beautiful skin photographing where, in order to brighten a color of skin of a face of woman or a face of a girl of which the skin is relatively white, when the picture image is generated by photographing the woman or girl, the luminance or chroma of a portion of the face in the picture image is adjusted through an image process.

The person photographing condition icon for recommending the person photographing condition is formed, for example, in a rectangular shape and is provided with an illustrated character line indicating the name allocated to the person photographing condition in order to allow the user to easily recognize the settable person photographing condition.

In the case of photographing a person by using the digital still camera 2, the user consecutively photographs the person for at least several seconds and tends to determine the photographing range or composition while reviewing the photographing state recommendation image that is obtained by the consecutive photographing.

For this reason, for example, every time when the unit image data are sequentially generated by the digital processing unit 31, the face of the person is detected, and if the face detection information is continuously input from the digital processing unit 31, the camera controller 20 sequentially compares the face detection information.

As a result, if the same type of face is substantially consecutively detected at substantially the same position of the consecutively several (10 or less) unit images, the camera controller 20 determines that the current situation is the person photographing situation where the person is consecutively photographed for checking the photographing state and the person is photographed. Actually, the camera controller 20 determines, in the person photographing situation, which types of persons and how many persons are photographed at this time.

Next, if the photographing situation is determined in this manner, the camera controller 20 first selects the blink avoidance photographing, which may be used for photographing any of the persons, as the settable person photographing condition that is to be recommended to the user.

In addition, the camera controller 20 determines based on the latest face detection information input from the digital processing unit 31 at this time whether or not the to-be-photographed person currently shows a smile face. As a result, if the to-be-photographed person does not currently show a smile face, the camera controller 20 selects the smile face waiting photographing as the settable person photographing condition that is to be recommended to the user.

In addition, the camera controller 20 also determines based on the latest face detection information input from the digital processing unit 31 at this time whether or not a woman or a girl is currently to be photographed. As a result, if the woman or the girl is currently to be photographed, the camera controller 20 selects the beautiful skin photographing as the settable person photographing condition that is to be recommended to the user.

If the person photographing situation is determined in this manner by consecutively photographing the person for checking the photographing state, the camera controller 20 selects, based on the face detection information, at least one or more settable person photographing conditions that are to be recommended to the user. In addition, in the hereinafter description, the person who is used to select the person photographing condition that is to be recommended to the user is referred to as a condition selection person.

Next, if one or a plurality of the settable person photographing conditions are selected, the camera controller 20 reads the person photographing condition icons for recommending the selected person photographing conditions from the non-volatile memory 35. The camera controller 20 transmits to the digital processing unit 31 one or the plurality of the person photographing condition icons read from the non-volatile memory 35.

If the person photographing condition icons are input from the camera controller 20, the digital processing unit 31 generates frame image data of, for example, a rectangular frame image for surrounding a portion of the face of the person shown in the unit image every time when the unit image data are generated.

In addition, the digital processing unit 31 generates combined image data by combining, with the unit image data sequentially generated, the frame image data corresponding to the position of the portion of the face of the person and by combining the person photographing condition icons input from the camera controller 20.

Next, the digital processing unit 31 transmits to the display 15B the combined image data sequentially, which are obtained by combining the frame image data and the person photographing condition icon with the unit image data. Therefore, as illustrated in FIG. 4, the digital processing unit 31 displays the photographing state recommendation image 37 (the unit image where the face of the person is shown) on the display 15B based on the combined image data.

In addition, the digital processing unit 31 displays the frame image 38 for surrounding the face of the person overlappedly on the photographing state recommendation image 37 based on the combined image data. In addition, the digital processing unit 31 also displays one or the plurality of the person photographing condition icons 39 to 41 overlappedly on the photographing state recommendation image 37 based on the combined image data.

Figure 4:
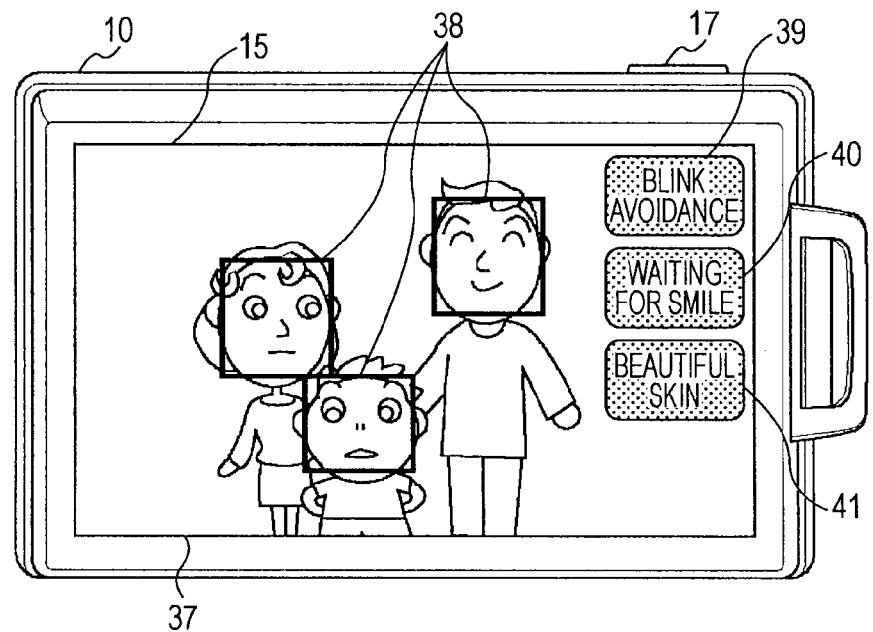
FIG. 4 is a schematic diagram illustrating a person photographing condition icon display (1).

A case illustrated in FIG. 4 where total three persons of one man, one women, and one boy are consecutively photographed, where the case where the woman and the boy do not have smile faces, and where three person photographing condition icons 39 to 41 are displayed is described.

At this time, the camera controller 20 selects the blink avoidance photographing as the settable person photographing condition if the situation is determined to be the person photographing situation. In addition, the camera controller 20 selects the smile face waiting photographing as the settable person photographing condition if the woman and the boy do not show smile faces.

In addition, the camera controller 20 selects the beautiful skin photographing as the settable person photographing condition if one woman is consecutively photographed. Therefore, at this time, the camera controller 20 transmits to the digital processing unit 31 the person photographing condition icon 39 for recommending the blink avoidance photographing, the person photographing condition icon 40 for recommending the smile face waiting photographing, and the person photographing condition icon 41 for recommending the beautiful skin photographing.

Next, at this time, the camera controller 20 controls the digital processing unit 31 to display the three person photographing condition icons 39 to 41 in a row parallel to the image vertical direction (that is, in the vertical row), for example, on the right end portion in the image horizontal direction of the photographing state recommendation image 37 as the initial state.

Therefore, although the person photographing condition icons 39 to 41 are displayed overlappedly on the photographing state recommendation image 37, the camera controller 20 allows the photographing state recommendation image 37 to be distinctly shown.

In addition, the person photographing condition icon 39 for recommending the blink avoidance photographing as the settable person photographing condition is provided with the illustrated character line "blink avoidance" indicating the name attached to the blink avoidance photographing.

In addition, the person photographing condition icon 40 for recommending the smile face waiting photographing as the settable person photographing condition is provided with the illustrated character line "smile face waiting" indicating the name attached to the smile face waiting photographing.

In addition, the person photographing condition icon 41 for recommending the beautiful skin photographing as the settable person photographing condition is provided with the illustrated character line "beautiful skin" indicating the name attached to the beautiful skin photographing.

Therefore, the camera controller 20 may recommend the person photographing condition settable for photographing the person at the time to the user by using the three the person photographing condition icons 39 to 41 displayed overlappedly on the photographing state recommendation image 37.

The person photographing condition icons 39 to 41 are generated so that the underlying photographing state recommendation image 37 such as a coarse mesh shape or a polka-dot pattern of an eye illustrated in a monochromic color such as white or gray in addition to the illustrated character line may be shown.

Therefore, although the person photographing condition icons 39 to 41 are displayed overlappedly on the photographing state recommendation image 37, the camera controller 20 allows the overlapped portions of the photographing state recommendation image 37 due to the person photographing condition icons 39 to 41 to be distinctly shown.

In other words, although the person photographing condition icons 39 to 41 are displayed overlappedly on the photographing state recommendation image 37, the camera controller 20 prevents the photographing state from being difficult to check due to the person photographing condition icons 39 to 41.

In addition, in the state where the person photographing condition icons 39 to 41 are displayed on the photographing state recommendation image 37, for example, if the shutter button 17 is half-pushed, the camera controller 20 recognizes that a display erasing command for temporarily erasing the display of the person photographing condition icons 39 to 41 is input.

Next, actually, if the shutter button 17 is half-pushed and if the display erasing command is input, the camera controller 20 erases the person photographing condition icons 39 to 41 from the photographing state recommendation image 37 during the time when the shutter button 17 is half-pushed.

In other words, during the time when the shutter button 17 is half-pushed, the camera controller 20 controls the digital processing unit 31 to display only the photographing state recommendation image 37 and the frame image 38 on the display 15B.

Therefore, during the time when the shutter button 17 is half-pushed, the camera controller 20 shows the entire of the photographing state recommendation image 37 and allows the photographing state of the person as the photographing object to be accurately checked.

In the case where the person photographing condition icons 39 to 41 are displayed overlappedly in the photographing state recommendation image 37, the camera controller 20 may allow the user to individually indicate the person's face or the person photographing condition icons 39 to 41 on the photographing state recommendation image 37 through a tapping manipulation.

In addition, the camera controller 20 may allow the user to move the person photographing condition icons 39 to 41 on the person's face on the photographing state recommendation image 37 through a sliding manipulation and indicate the moved person photographing condition icons 39 to 41 and the person's face overlapped.

Figure 5:
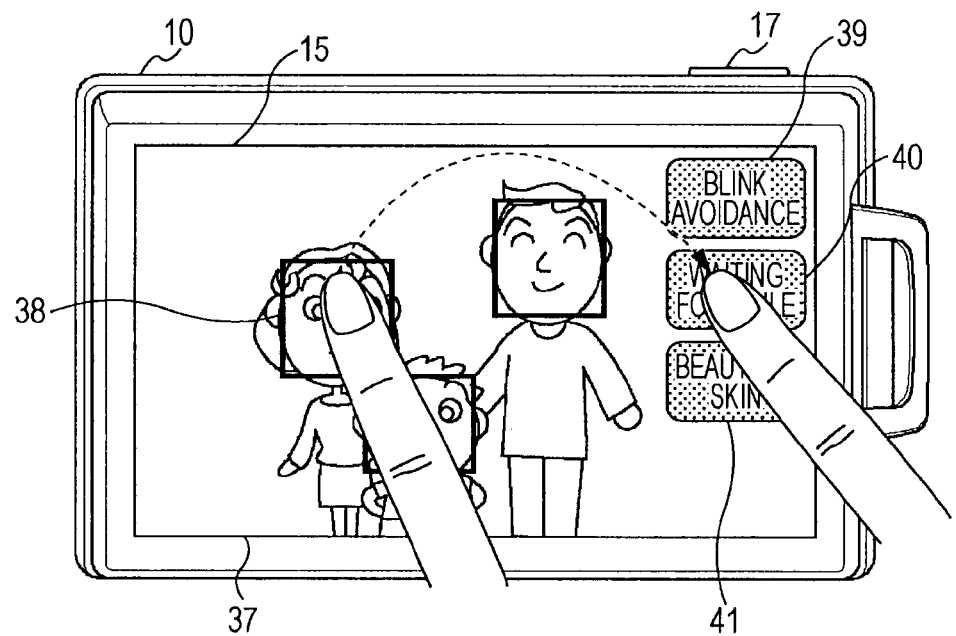
FIG. 5 is a schematic diagram illustrating a person photographing condition selection (1).

Next, as illustrated in FIG. 5, after the person's face is indicated, if the person photographing condition icons 39 to 41 are indicated, the camera controller 20 recognizes that the person photographing conditions indicated by the indicated person photographing condition icons 39 to 41 are selected for the indicated person.

Figure 6:
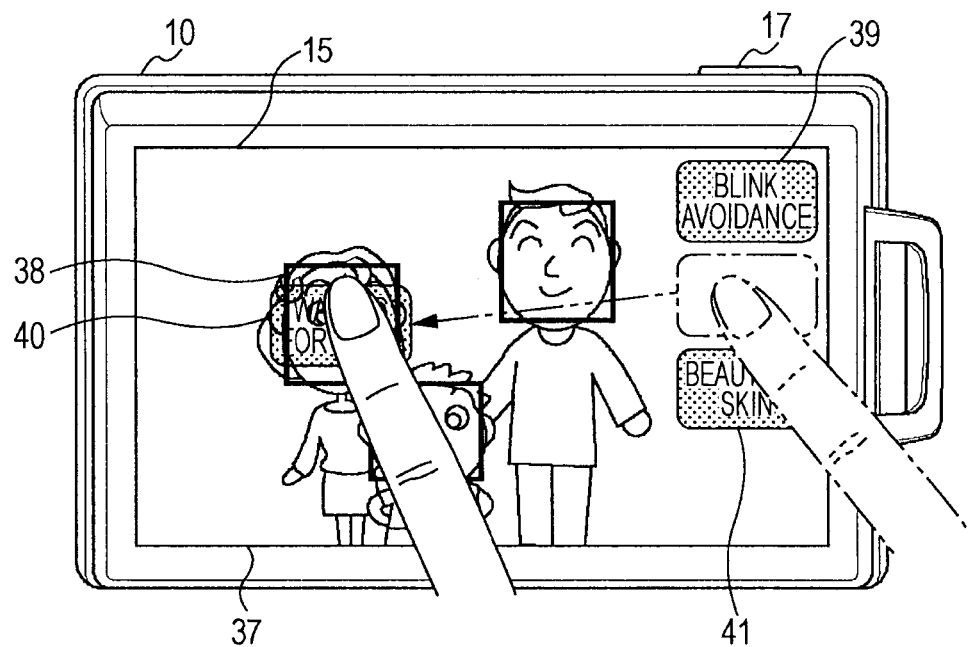
FIG. 6 is a schematic diagram illustrating a person photographing condition selection (2).

In addition, as illustrated in FIG. 6, if the person photographing condition icons 39 to 41 are allowed to be moved on the person's face, the camera controller 20 recognizes that the person photographing conditions indicated by the person photographing condition icons 39 to 41 indicated by the movement are selected for the indicated person according to the movement.

In other words, if the person photographing condition icon 39 for the blink avoidance photographing together with the face of any one the persons in the photographing state recommendation image 37 is indicated by the user's tapping manipulation or sliding manipulation, the camera controller 20 recognizes that the blink avoidance photographing for the indicated person is selected.

In addition, if the person photographing condition icon 40 for the smile face waiting photographing together with the face of any one of the woman and the boy in the photographing state recommendation image 37 is indicated by the user's tapping manipulation or sliding manipulation, the camera controller 20 recognizes that the smile face waiting photographing for the indicated woman or boy is selected.

In addition, if the person photographing condition icon 41 for the beautiful skin photographing together with the face of the woman in the photographing state recommendation image 37 is indicated by the user's tapping manipulation or sliding manipulation, the camera controller 20 recognizes that the beautiful skin photographing for the indicated woman is selected.

However, although a combination of the person and one or the plurality of the person photographing conditions is selected, for example, if the portion of the face of the corresponding person is tapped consecutively twice, the camera controller 20 releases the selection of one or the plurality of the person photographing conditions combined with the person collectively. Therefore, although a person photographing condition is erroneously selected by the user, the camera controller 20 may easily release the selection by a simple, easy manipulation.

In addition, if the person photographing condition is selected in combination with a face of a person different from the face of the perform for condition selection, the camera controller 20 displays a caution message on the photographing state recommendation image 37 to notice that the person photographing condition may not be selected as the combination.

In other words, similarly to the case of the smile face waiting photographing for waiting for and automatically photographing a smile face of the person, who has already been showing a smile face, in the case where the person photographing condition that may not be implemented and obtained in the combination with the person is selected, the camera controller 20 may appropriately notice the fact.

In addition, similarly to the case of the beautiful skin photographing for brightening a color of skin of the face of a man or a boy, in the case where the nonsense person photographing condition according to the combination with the person is selected, the camera controller 20 may appropriately notice the fact.

However, if the portion other than the face of the person and the person photographing condition icons 39 to 41 is tapped consecutively twice in the photographing state recommendation image 37, the camera controller 20 determines that a display form changing command for changing the display form of the person photographing condition icons 39 to 41 is input.

Even after the current situation is determined to be the person photographing situation, the camera controller 20 acquires the face detection information, which is input from the digital processing unit 31 as a result of the execution of the face detection process, until the person is actually photographed.

In addition, at this time, the camera controller 20 tracks the position of the face of one or the plurality of the persons for condition selection (that is, the position of the estimated area where the face of the person is shown) with respect to each person photographing condition recommended to the user, based on the area position information inserted into the face detection information.

Therefore, if the display form changing command is input, the camera controller 20 transmits to the digital processing unit 31 the latest position of the face of the person for condition selection with respect to each of the person photographing conditions and person photographing condition icons 39 to 41 indicating the person photographing conditions in a correspondence manner.

If the latest position of the face of the person for condition selection and the person photographing condition icons 39 to 41 are input in a correspondence manner from the camera controller 20, the digital processing unit 31 generates the combined image data by combining the person photographing condition icons corresponding to the position with the unit image data.

Figure 7:
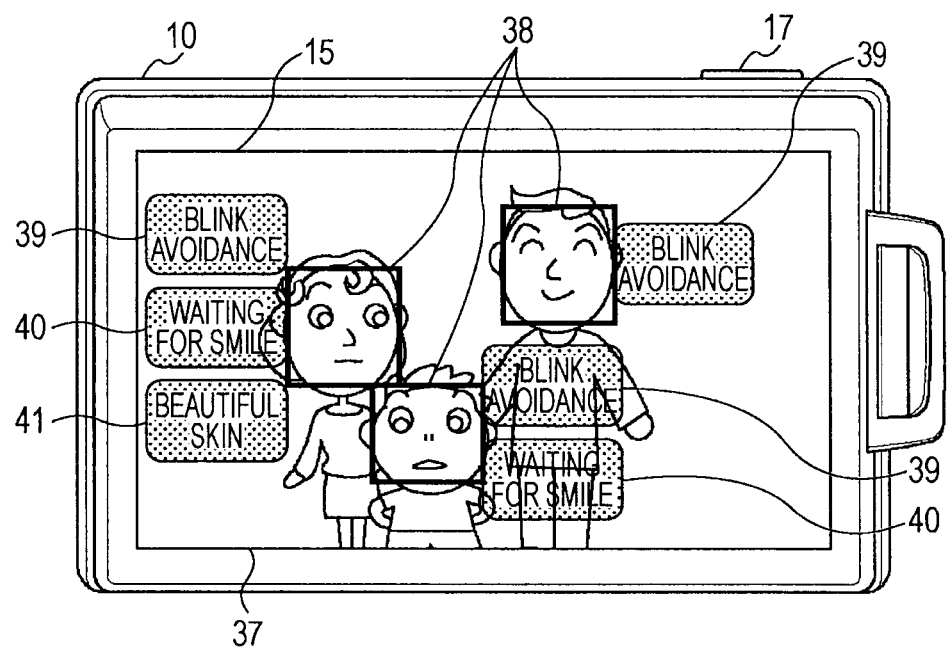
FIG. 7 is a schematic diagram illustrating a person photographing condition icon display (2).

Next, the digital processing unit 31 transmits the combined image data to the display 15B. Therefore, as illustrated in FIG. 7, the digital processing unit 31 displays the photographing state recommendation image 37 (the unit image where the face of the person is shown) on the display 15B based on the combined image data.

In addition, the digital processing unit 31 displays one or the plurality of the person photographing condition icons 39 to 41 indicating the person photographing condition selected based on the person for condition selection in the vicinity of the face of each of the persons for condition selection on the photographing state recommendation image 37 based on the combined image data.

In this manner, the camera controller 20 changes the display positions of the person photographing condition icons 39 to 41 overlapping in the photographing state recommendation image 37 to the vicinity of the face of the corresponding condition selection person. Therefore, the camera controller 20 allows the user to intuitively recognize which person the person photographing conditions indicated by the person photographing condition icons 39 to 41 are valid in the photographing of, based on the position relationship between the person's face and the person photographing condition icons 39 to 41.

In this manner, in the case where the display positions of the person photographing condition icons 39 to 41 are changed, the camera controller 20 allows the user to individually indicate only the person photographing condition icons 39 to 41 through the tapping manipulation.

Therefore, at this time, through only the indication of the person photographing condition icons 39 to 41, the camera controller 20 recognizes that the person photographing conditions indicated by the indicated person photographing condition icons 39 to 41 are selected for the person of the face which is in the vicinity of the person photographing condition icons 39 to 41.

In the display format where the person photographing condition icons 39 to 41 is allowed to be in the vicinity of the face of the person, the camera controller 20 controls the digital processing unit 31, for example, to change display colors (to allow the display colors to be different from original colors) of the frame image 38 surrounding a portion of the face of the person with respect to each person.

If the person photographing condition icons 39 to 41 are indicated in such a display format, the camera controller 20 changes the indicated person photographing condition icons 39 to 41 to the same display colors as the display colors of the frame image 38 for the corresponding person. Therefore, the camera controller 20 may allows the user to easily recognize which one of the person and which one of the person photographing conditions are combined and selected.

In such a display format, although the person photographing conditions are selected for the person, if the person photographing condition icons 39 to 41 indicating the selected person photographing conditions are tapped consecutively twice, the camera controller 20 individually releases the person photographing condition selection. Therefore, although the person photographing condition is erroneously selected by the user, the camera controller 20 may easily release the selection.

At this time, the camera controller 20 returns the display color of the person photographing condition icons 39 to 41 indicating the person photographing conditions of which the selection is released (that is, the display color changed to indicate the selection) to the original display color. Therefore, the camera controller 20 may allow the user to easily check that the person photographing condition selection is released.

In addition, in such a display format, although the plurality of the person photographing conditions are selected for the person, if a portion of the face of the person is tapped consecutively twice, the camera controller 20 releases the plurality of the person photographing conditions selected for the person collectively. Therefore, although the person photographing conditions are erroneously selected by the user, the camera controller 20 may easily release the selection through a simple, easy manipulation.

At this time, the camera controller 20 also returns the display color of the person photographing condition icons 39 to 41 indicating the person photographing conditions of which the selection is released (that is, the display color changed to indicate the selection) to the original display color.

Therefore, the camera controller 20 may allow the user to easily check that the person photographing condition selection is released.

In this manner, the camera controller 20 allows the person photographing condition icons 39 to 41 to be indicated on the photographing state recommendation image 37, so that at least one or more person photographing conditions may be selected for photographing the person.

Next, if a portion other than the person's face and the person photographing condition icons 39 to 41 is tapped (once) in the photographing state recommendation image 37, the camera controller 20 determines that a selection establishing command for establishing (that is, for completing) the person photographing condition selection is input.

If the selection establishing command for establishing the person photographing condition selection is input in this manner, the camera controller 20 reads the condition setting information corresponding to the selected person photographing condition from the non-volatile memory 35.

In addition, the camera controller 20 sets the camera controller itself, the digital processing unit 31, or the like by using the latest position of the face of the person, which is selected together with the person photographing condition, and the condition setting information so that the person may be photographed in the person photographing condition.

In addition, in order to select and obtain at least one or more person photographing condition on the photographing state recommendation image 37 as described above, if the plurality of the person photographing conditions are selected, the camera controller 20 sets the photographing by combining the plurality of the selected person photographing conditions.

Actually, for example, if the person photographing condition is set to the automatic photographing such as the smile face waiting photographing, the camera controller 20 invalidates the input of the photographing command in response to the fully pressing manipulation of the shutter button 17.

For example, if the person is set to be photographed in the smile face waiting photographing by the camera controller 20, every time when the unit image data is generated, the digital processing unit 31 tracks and detects the face of the person selected together with the smile face waiting photographing in the unit image. In addition, the digital processing unit 31 specifies a mouth, an eye, or the like on the tracked and detected face of the person and detects based on the shape of the specified mouth, eye, or the like whether or not the face is a smile face.

Next, if the digital processing unit 31 detects that the detected and detected face of the person is changed from the non-smile face to the smile face, the digital processing unit 31 transmits to the camera controller 20 the photographing command indicating that the person is allowed to be photographed at this time.

If the photographing command is input from the digital processing unit 31, the camera controller 20 controls the timing generator 28 in response to the input of the photographing command to allow the image capturing light to expose the light-receiving surface of the image capturing device 27 at a preset shutter speed for photographing.

At this time, as described above, the image capturing device 27 photoelectrically-converts exposing the light-receiving surface to generate the photoelectrically-converted signal for photographing and transmits the generated photoelectrically-converted signal for photographing to the analog processing unit 29.

As described, the analog processing unit 29 also applies an analog process on the photoelectrically-converted signal for photographing input from the image capturing device 27 to generate the image capturing signal for photographing. The analog-digital converter 30 converts the image capturing signal for photographing into the image capturing data for photographing and transmits to the digital processing unit 31.

At this time, as described above, the digital processing unit 31 applies a predetermined digital process for photographing on the image capturing data for photographing input from the analog-digital converter 30. Therefore, the digital processing unit 31 generates the picture image data that are obtained by photographing the photographing range including the person as the photographing object.

In addition, the digital processing unit 31 applies the compression encoding process on the picture image data to generate the compressed image data. At this time, the digital processing unit 31 further applies the reduction process on the picture image data to generate the thumbnail data. Next, the digital processing unit 31 transmits the compressed image data together with the thumbnail data to the camera controller 20.

At this time, if the person is set to be photographed in the blink avoidance photographing in addition to the smile face waiting photographing, the camera controller 20 controls consecutively twice the timing generator 28 in response to the input of the photographing command from the digital processing unit 31. Therefore, the camera controller 20 allows the light-receiving surface of the image capturing device 27 to be exposed by the image capturing light at an increasing shutter speed consecutively twice for the photographing.

At this time, every time when the light-receiving surface is exposed by the image capturing light, the image capturing device 27 photoelectrically-converts the image capturing light exposing the light-receiving surface to generate the photoelectrically-converted signal for photographing according to the exposing image capturing light and sequentially transmits the generated photoelectrically-converted signal for photographing to the analog processing unit 29.

Every time when the photoelectrically-converted signal for photographing is input from the image capturing device 27, the analog processing unit 29 applies a predetermined analog process such as an amplification process on the photoelectrically-converted signal for photographing to generate the image capturing signal for photographing. In addition, the analog processing unit 29 converts the image capturing signal for photographing into the image capturing data for photographing through the analog-digital converter 30 and sequentially transmits to the digital processing unit 31.

At this time, every time when the image capturing data for photographing are input from the analog-digital converter 30, the digital processing unit 31 applies a predetermined digital process for photographing on the image capturing data for photographing. Therefore, the digital processing unit 31 generates two picture image data that are obtained by photographing twice the photographing range including the person as the photographing object.

If the two picture image data are generated in this manner, the digital processing unit 31 refers to the position of the person's face in the unit image, the digital processing unit 31 detects the face of the person that is selected together with the blink avoidance photographing in the two picture images based on the two picture image data.

In addition, the digital processing unit 31 specifies the eye in the face of the persons detected from each of the two picture images and detects based on the shape of the specified eye whether or not the person closes the eyes. As a result, if the person opens the eyes in the one picture image and if the person closes the eyes in the other picture image, the digital processing unit 31 allows the one picture image to remain and discards the other picture image.

Next, the digital processing unit 31 applies the compression encoding process on the picture image data of the one remaining picture image to generate the compressed image data. At this time, the digital processing unit 31 also applies the reduction process for culling the pixels on the picture image data to generate the thumbnail data. Next, the digital processing unit 31 transmits the compressed image data together with the thumbnail data to the camera controller 20.

However, at this time, if the person opens the eyes in both of the picture images, the digital processing unit 31, for example, allows the one picture image, which is generated earlier, to remain and discards the other picture image, which is generated latter.

Next, the digital processing unit 31 applies the compression encoding process on the picture image data of the one remaining picture image to generate the compressed image data. In addition, the digital processing unit 31 also generates the thumbnail data based on the picture image data. Next, the digital processing unit 31 transmits the compressed image data together with the thumbnail data to the camera controller 20.

At this time, if the person closes the eyes in both of the picture images, the digital processing unit 31 discards both of the picture images and notices the discard to the camera controller 20. If the discard of both of the picture images are noticed by the digital processing unit 31, the camera controller 20 notices, for example, the user through display 15B that the blink avoidance photographing fails so that the person may not be photographed.

At this time, if the person is set to be photographed by the beautiful skin photographing in addition to the smile face waiting photographing and the blink avoidance photographing, when the picture image data that are to be subjected to the compression encoding process is generated, the digital processing unit 31 performs the image process on the picture image data before the compression encoding process.

Therefore, the digital processing unit 31 corrects the skin color of the face to be bright by adjusting the luminance or the chroma of the portion of the face of the person selected together with the beautiful skin photographing in the picture image based on the picture image data.

Next, the digital processing unit 31 applies the compression encoding process on the picture image data that are subjected to the image process to generate the compressed image data. In addition, the digital processing unit 32 also generates the thumbnail data based on the picture image data. Next, the digital processing unit 31 transmits the compressed image data together with the thumbnail data to the camera controller 20.

On the other hand, for example, if the person photographing condition is not set to the automatic photographing such as the smile face waiting photographing and if the person is set to be photographed in the blink avoidance photographing, the camera controller 20 validates the input of the photographing command in response to the fully pressing manipulation of the shutter button 17.

Next, for example, if the photographing command is input in response to the fully pressing manipulation of the shutter button 17 in the state where the person is to be photographed in the blink avoidance photographing, the camera controller 20 controls consecutively twice the timing generator 28 in response to the input of the photographing command.

Therefore, as described above, the camera controller 20 allows the light-receiving surface of the image capturing device 27 to be exposed by the image capturing light at an increasing shutter speed consecutively twice for photographing, so that the digital processing unit 31 may be allowed to generate two picture image data.

Accordingly, at this time, as described above, the digital processing unit 31 selects one picture image data to generate the compressed image data and the thumbnail data and transmits to the camera controller 20, otherwise discards the picture image data and notices the fact to the camera controller 20. In addition, at this time, if the discard of the two picture image data is noticed from the digital processing unit 31, the camera controller 20 notices the user that the blink avoidance photographing fails, as described above.

At this time, if the person is set to be photographed by the beautiful skin photographing in addition to the blink avoidance photographing, when the picture image data that are to be subjected to the compression encoding process is generated as described, the digital processing unit 31 performs the image process on the picture image data in advance. Next, the digital processing unit 31 generates the compressed image data and the thumbnail data based on the picture image data that are subjected to the image process and transmits to the camera controller 20.

In addition, for example, if the blink avoidance photographing or the smile face waiting photographing is not set and if the person is set to be photographed in the beautiful skin photographing, when the photographing command is input in response to the fully pressing manipulation of the shutter button 17, the camera controller 20 controls the timing generator 28 in response to the input.

Therefore, the camera controller 20 allows the image capturing light to expose the light-receiving surface of the image capturing device 27 at a preset shutter speed for photographing. Accordingly, at this time, as described above, the image capturing device 27 photoelectrically-converts the image capturing light exposing the light-receiving surface to generate the photoelectrically-converted signal for photographing according to the exposing image capturing light and transmits the generated photoelectrically-converted signal for photographing to the analog processing unit 29.

In addition, as described above, the analog processing unit 29 generates the image capturing signal for photographing based on the photoelectrically-converted signal for photographing input from the image capturing device 27. The analog-digital converter 30 converts the generated image capturing signal for photographing to the image capturing data for photographing and transmits to the digital processing unit 31.

As described above, the digital processing unit 31 generates the picture image data based on the image capturing data for photographing input from the analog-digital converter 30 and performs an image process on the generated picture image data. In addition, the digital processing unit 31 generates the compressed image data and the thumbnail data based on the picture image data that are subjected to the image process and transmits to the camera controller 20.

If the compressed image data and the thumbnail data are input from the digital processing unit 31, the camera controller 20 generates the image file as described above. In addition, the camera controller 20 records the image file together with the thumbnail data in the recording device 34.

In this manner, the camera controller 20 allows the user to photograph the person in the selected various person photographing conditions and allows the picture image data, which are obtained as the result thereof, to be recorded as the image file.

In addition, if any person photographing condition is selected and if the person photographing condition for any person is not set, the camera controller 20 validates the input of the photographing command in response to the fully pressing manipulation of the shutter button 17.

Next, if the photographing command is input in response to the fully pressing manipulation of the shutter button 17 in the state where any person photographing condition is not set, the camera controller 20 allows the person as the photographing object to be photographed in the previously-set photographing condition similarly to the case where the photographing condition recommendation setting process is not executed. In other words, in this case, the camera controller 20 allows the person or the non-human object to be photographed in a photographing condition, which is initially set, or in a photographing condition, which is arbitrarily manually set by the user.

On the other hand, although the face detection process is executed every time when the unit image data is generated sequentially as described above, if any face of the person is not detected in the unit image based on the unit image data, the digital processing unit 31 transmits to the camera controller 20 the non-detection information indication the non-detection of the face instead of the face detection information.

Therefore, if the non-detection information is input from the digital processing unit 31, the camera controller 20 counts, for example, the number of consecutive input of the nor-detection information. Next, if the face of the person is not detected in the consecutive several (ten or less) unit images and if the non-detection information is input, the camera controller 20 determines that the non-human object is consecutively photographed for checking the photographing state and the current situation is the non-human object photographing situation where the non-human object is photographed.

If the current situation is determined to be the non-human object photographing situation in this manner, the camera controller 20 executes a photographing condition acquisition process for acquiring the settable non-human object photographing condition for photographing the non-human object from the photographing condition providing apparatus 3.

The digital still camera 2 has a radio communication function so as to be connected to the network 4 by using an access point (base station) for wireless LAN (Local Area Network).

The digital still camera 2 may be freely carried and used for photographing in various places, but it is not necessarily used within the communication area of the access point.

In addition, as described above, the photographing condition providing apparatus 3 acquires the non-human object photographing conditions from a number of users, which actually photographed the non-human object, and provides the acquired non-human object photographing conditions to the public. For this reason, the photographing condition providing apparatus 3 may not necessarily maintain the non-human object photographing conditions of all the non-human objects which were actually photographed.

Therefore, if the current situation is determined to be the non-human object photographing situation, the camera controller 20 determines whether or not the digital still camera 2 is in the environment where the digital still camera 2 is accessible to the network 4 by using the communication processing unit 43 and the network interface 44.

As a result, if the digital still camera 2 is currently in the environment where the digital still camera 2 may be connected to the network 4, the camera controller 20 communicates with a GPS satellite through the GPS receiver 32 to detect the current position of the camera. In addition, at this time, the camera controller 20 also detects the current camera direction by using the orientation sensor 33.

In addition, the camera controller 20 generates a query signal for querying whether or not the non-human object photographing condition is providable for photographing the non-human object which may be photographed in the detected current camera position and camera direction. At this time, the camera controller 20 inserts into the query signal the camera position information indicating the detected current camera position and the detected camera direction information indicating the current camera direction.

If the query signal is generated in this manner, the camera controller 20 transmits the generated query signal to the photographing condition providing apparatus 3 on the network 3 through the communication processing unit 43 and the network interface 44 sequentially.

As a result, if the providable notice signal indicating that the non-human object photographing condition may be provided is transmitted from the photographing condition providing apparatus 3, the camera controller 20 receives the providable notice signal through the network interface 44 and the communication processing unit 43 sequentially.

If the providable notice signal is received, the camera controller 20 extracts from the providable notice signal the non-human object identification information which is inserted for specifying the providable non-human object photographing condition by the photographing condition providing apparatus 3 as described latter.

In addition, in response to reception of the providable notice signal, the camera controller 20 transmits to the digital processing unit 31 an extraction indication signal indicating to extract an image feature amount (hereinafter, referred to as a unit image feature amount) of the entire unit images.

If the extraction indication signal is input from the camera controller 20, the digital processing unit 31 sets, for example, the unit image data which are generated at the time of input of the extraction indication signal, as the extraction object for the unit image feature amount.

Next, the digital processing unit 31 extracts from the unit image based on the unit image data set as the extraction object, for example, forms of a plurality of contours, a position relationship between the plurality of the contours, colors, or the like as a unit image feature amount. The digital processing unit 31 transmits to the camera controller 20 the unit image feature amount extracted from the unit image.

If the unit image feature amount is input from the digital processing unit 31, the camera controller 20 generates a condition request signal for requesting the non-human object photographing condition settable for photographing the non-human object. At this time, the camera controller 20 inserts the aforementioned non-human object identification information together with the unit image feature amount into the condition request signal.

If the condition request signal is generated in this manner, the camera controller 20 transmits the generated condition request signal to the photographing condition providing apparatus 3 on the network 3 through the communication processing unit 43 and the network interface 44 sequentially.

As a result, if the condition providing signal for providing the plurality of the different the non-human object photographing conditions is transmitted from the photographing condition providing apparatus 3, the camera controller 20 receives the condition providing signal through the network interface 44 and the communication processing unit 43 sequentially.

In this case, a plurality of sets of the photographing condition icon for indicating the non-human object photographing condition (for recommending to the user) and the condition setting information used for setting of the non-human object photographing condition in a correspondence manner with respect to each non-human object photographing condition are inserted into the condition providing signal.

In addition, in the hereinafter description, a photographing condition icon for indicating (for recommending to a user) a non-human object photographing condition is referred to as a non-human object photographing condition icon. In addition, the condition setting information is generated to contain various setting values for photographing such as shutter speed, exposure, white balance, color temperature, ISO sensitivity, and color tone.

For this reason, if the condition providing signal transmitted from the photographing condition providing apparatus 3 is received, the camera controller 20 extracts a plurality of sets of the non-human object photographing condition icons and the condition setting information from the condition providing signal.

Next, the camera controller 20 temporarily stores the plurality of pieces of the condition setting information extracted from the condition providing signal, for example, in the non-volatile memory 35. In addition, the camera controller 20 transmits the plurality of the non-human object photographing condition icon extracted from the condition providing signal to the digital processing unit 31.

If the plurality of the non-human object photographing condition icons are input from the camera controller 20, every time when the unit image data is generated, the digital processing unit 31 generates a combined image data by combining the unit image data and the plurality of the non-human object photographing condition icons. Next, the digital processing unit 31 sequentially transmits the combined image data, which are obtained by combining the unit image data and the plurality of the non-human object photographing condition icons, to the display 15B.

Figure 8:
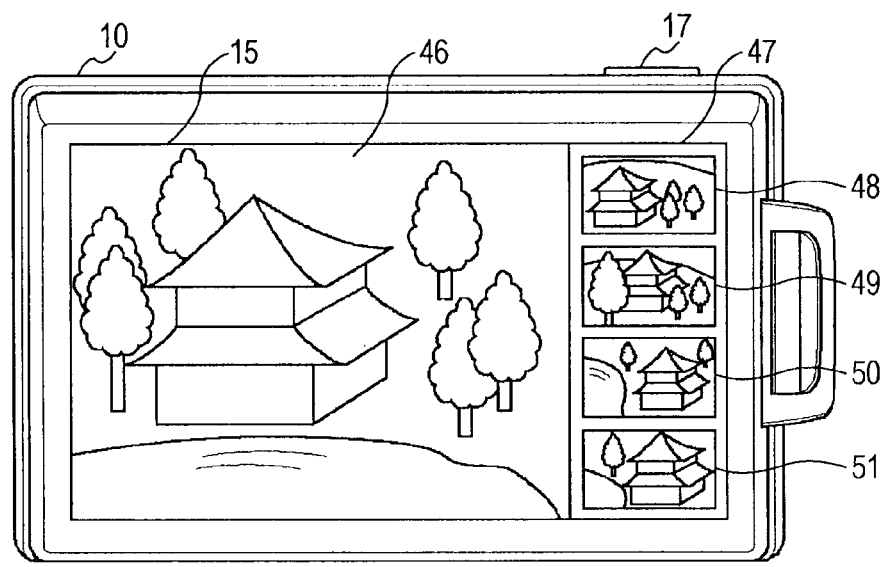
FIG. 8 is a schematic diagram illustrating a non-human object photographing condition icon display.

Therefore, as illustrated in FIG. 8, the digital processing unit 31 displays the photographing state recommendation image 46 (the unit image where the non-human object is shown) on the display 15B based on the combined image data. In addition, the digital processing unit 31 displays the icon layout portion 47, which has, for example, a strip shape parallel to the image vertical direction, overlappedly on the right end portion in the image horizontal direction of the photographing state recommendation image 46 based on the combined image data.

Next, the digital processing unit 31 displays the plurality of the non-human object photographing condition icons 48 to 51 overlappedly on the icon layout portion 47 based on the combined image data in the state that the non-human object photographing condition icons 48 to 51 are aligned in a row parallel to the image vertical direction (that is, in the vertical row).

Therefore, although the non-human object photographing condition icons 48 to 51 are displayed overlappedly on the photographing state recommendation image 46, the camera controller 20 allows the photographing state recommendation image 46 to be distinctly shown.

In other words, although the non-human object photographing condition icons 48 to 51 are displayed overlappedly on the photographing state recommendation image 46, the camera controller 20 prevents the photographing state of the non-human object from being difficult to check due to the non-human object photographing condition icons 48 to 51.

In addition, each of the non-human object photographing condition icons 48 to 51 are generated as a thumbnail of the picture images that are obtained by actually photographing the non-human object in the non-human object photographing conditions indicated by the non-human object photographing condition icons 48 to 51.

Therefore, the camera controller 20 may recommend to the user the non-human object photographing conditions settable for photographing the non-human object by using the plurality of the non-human object photographing condition icons 48 to 51 as the picture image that is obtained by actually photographing the non-human object in the non-human object photographing condition.

At this time, if the sliding manipulation is performed in parallel to the image vertical direction in the icon layout portion 47 by the user, the camera controller 20 controls the digital processing unit 31 according to the sliding manipulation. Therefore, the camera controller 20 scrolls the non-human object photographing condition icons 48 to 51 on the icon layout portion 47 in the image vertical direction.

In other words, the camera controller 20 allows the non-human object photographing condition icons 48 to 51 displayed in advance on the icon layout portion 47 to move to the outside of the icon layout portion 47. Accordingly, the camera controller 20 allows the non-human object photographing condition icons 48 to 51, which is not yet displayed on the icon layout portion 47, to be moved within the icon layout portion 47.

Therefore, although the number of the non-human object photographing condition icons 48 to 51 is larger than the number thereof that may be displayed collectively on the icon layout portion 47, the camera controller 20 may appropriately change and show the non-human object photographing condition icons 48 to 51.

In addition, in the state where the non-human object photographing condition icons 48 to 51 are displayed on the photographing state recommendation image 46, if the shutter button 17 is half-pushed, the camera controller 20 recognizes that a display erasing command for temporarily erasing the display of the non-human object photographing condition icons 48 to 51 is input.

Next, actually, if the shutter button 17 is half-pushed and if the display erasing command is input, the camera controller 20 erases the non-human object photographing condition icons 48 to 51 together with the icon layout portion 47 from the photographing state recommendation image 46 during the time when the shutter button 17 is half-pushed.

In other words, during the time when the shutter button 17 is half-pushed, the camera controller 20 controls the digital processing unit 31 to display only the photographing state recommendation image 46 on the display 15B. Therefore, during the time when the shutter button 17 is half-pushed, the camera controller 20 shows the entire of the photographing state recommendation image 46 and allows the photographing state of the non-human object as the photographing object to be accurately checked.

However, if the user selects one of the recommended non-human object photographing conditions, there is a high probability in that the user may select the non-human object photographing condition, which the user does not consider, different from the current non-human object photographing condition (for example, the initially-set photographing condition).

For this reason, as described later, the photographing condition providing apparatus 3 selects and provides the non-human object photographing condition for photographing so that color feeling of the non-human object greatly differs from the current photographing state, for example, by a color tone, a chroma, a luminance, a white balance, or the like.

In addition, the photographing condition providing apparatus 3 provides the selected non-human object photographing condition as the non-human object photographing condition icons 48 to 51 that becomes the thumbnails of the picture images that are obtained by actually photographing the non-human object in the non-human object photographing condition.

Next, the camera controller 20 displays the non-human object photographing condition icons 48 to 51 overlappedly on a portion of the photographing state recommendation image 46. Therefore, the camera controller 20 allows the photographing state recommendation image 46 to be easily shown and compared with the thumbnails as the non-human object photographing condition icons 48 to 51, so that the non-human object photographing condition for photographing the non-human object in desired color feeling may be selected.

Actually, in the case where the non-human object photographing condition icons 48 to 51 are displayed overlappedly on the photographing state recommendation image 46, the camera controller 20 may allow the user to individually indicate the non-human object photographing condition icons 48 to 51 on the photographing state recommendation image 46 through the tapping manipulation.

Next, if any one of the non-human object photographing condition icons 48 to 51 is indicated by the user, the camera controller 20 recognizes that the non-human object photographing condition indicated by the indicated non-human object photographing condition icons 48 to 51 is selected.

However, if any one of the non-human object photographing condition icons 48 to 51 is indicated, the camera controller 20 maintains the display color of the indicated non-human object photographing condition icons 48 to 51.

In addition, the camera controller 20 changes the remaining non-human object photographing condition icons 48 to 51, which are not indicated, into gray display by decreasing the luminance thereof. Therefore, the camera controller 20 allows the user to easily check which one of the non-human object photographing conditions as the non-human object photographing condition icons 48 to 51 is selected.

However, although the non-human object photographing condition is selected, for example, if one of the non-human object photographing condition icons 48 to 51 indicated by the selected non-human object photographing condition is tapped consecutively twice, the camera controller 20 releases the selection of the non-human object photographing condition. Therefore, although the non-human object photographing conditions are erroneously selected by the user, the camera controller 20 may easily release the selection.

In addition, if the non-human object photographing condition selection is released, the camera controller 20 returns the display state to the original display state by increasing the luminance of the non-human object photographing condition icons 48 to 51 displayed in gray. Therefore, the camera controller 20 allows it to be recognized that any one of the non-human object photographing condition icons 48 to 51 is freely indicated.

In this manner, the camera controller 20 allows the non-human object photographing condition icons 48 to 51 to be indicated on the photographing state recommendation image 46, so that the non-human object photographing condition may be selected for photographing the non-human object.

Next, if a portion other than the non-human object photographing condition icons 48 to 51 is tapped (once) in the photographing state recommendation image 46, the camera controller 20 determines that a selection establishing command for establishing (that is, for completing) the non-human object photographing condition selection is input.

If the selection establishing command for establishing the non-human object photographing condition selection is input in this manner, the camera controller 20 reads the condition setting information corresponding to the selected non-human object photographing condition from the non-volatile memory 35. In addition, the camera controller 20 sets the camera controller 20 itself, the digital processing unit 31, or the like by using the condition setting information so that the non-human object may be photographed in the selected non-human object photographing condition.

In this state, if the photographing command is input through fully pressing of the shutter button 17, the camera controller 20 controls the lens unit 26 or the timing generator 28 in response to the input of the photographing command. Therefore, the camera controller 20 allows the light-receiving surface of the image capturing device 27 to be exposed for photographing by the image capturing light of the exposure amount indicated by the non-human object photographing condition at the shutter speed indicated by the non-human object photographing condition.

At this time, the image capturing device 27 photoelectrically-converts the image capturing light exposing the light-receiving surface to generate the photoelectrically-converted signal for photographing according to the exposing image capturing light and transmits the generated photoelectrically-converted signal for photographing to the analog processing unit 29.

The analog processing unit 29 applies an analog process according to the non-human object photographing condition on the photoelectrically-converted signal for photographing input from the photographing device 27 to generate the image capturing signal for photographing. In addition, the analog processing unit 29 converts the image capturing signal for photographing into the image capturing data for photographing through the analog-digital converter 30 and transmit to the digital processing unit 31.

At this time, the digital processing unit 31 applies a digital process for photographing according to the non-human object photographing condition on the image capturing data for photographing input from the analog-digital converter 30. Therefore, the digital processing unit 31 generates the picture image data that are obtained by photographing the photographing range including the non-human object as the photographing object.

In addition, the digital processing unit 31 applies the compression encoding process on the picture image data to generate the compressed image data. The digital processing unit 31 further applies the reduction process for culling the pixels on the picture image data to generate the thumbnail data. Next, the digital processing unit 31 transmits the compressed image data together with the thumbnail data to the camera controller 20.

In this manner, if the compressed image data and the thumbnail data are input from the digital processing unit 31, the camera controller 20 generates the image file as described above. In addition, the camera controller 20 records the image file together with the thumbnail data in the recording device 34.

In this manner, the camera controller 20 allows the user to photograph the non-human object in the selected non-human object photographing condition and allows the obtained picture image data to be recorded as the image file.

In addition, although the plurality of the non-human object photographing conditions are recommended to the user, if the shutter button 17 is fully pressed without selection of any one of the conditions and if the photographing command is input, the camera controller 20 allows the non-human object to be photographed in the previously-set photographing condition. In other words, in this case, the camera controller 20 allows the non-human object to be photographed in a photographing condition, which is initially set, or in a photographing condition, which is arbitrarily manually set by the user.

In addition, when the situation is determined to be the non-human object photographing situation, if the digital still camera 2 is not in the environment where the digital still camera 2 is accessible to the network 4, the camera controller 20 also allows the non-human object to be photographed in the previously-set photographing condition.

In addition, even in the case where, in the non-human object photographing situation, the non-human object photographing condition icon is not provided through the communication with the photographing condition providing apparatus 3, the camera controller 20 allows the non-human object to be photographed in the previously-set photographing condition.

However, for example, if the reproducing button 18 of the manipulation unit 23 is pressed, or if a change from the operation mode to the reproduction mode is indicated through the tapping manipulation on the touch panel 15A, the camera controller 20 operates in the reproduction mode.

In the reproduction mode, the camera controller 20 reads from a recording device 34 a plurality of thumbnail data recorded therein. Next, the camera controller 20 transmits the plurality of the thumbnail data to the display 15B through the digital processing unit 31. Therefore, the camera controller 20 lists and displays the thumbnails on the display 15B based on the plurality of the thumbnail data.

In this state, if arbitrary one thumbnail is selected among the plurality of the thumbnails through the tapping manipulation or the like, the camera controller 20 reads an image file corresponding to the selected thumbnail from the recording device 34. Next, the camera controller 20 culls the compressed image data from the image file and transmits to the digital processing unit 31.

At this time, under the control of the camera controller 20, the digital processing unit 31 applies the decompression decoding process on the compressed image data input from the camera controller 20 to generate the original picture image data. Next, the digital processing unit 31 transmits the picture image data to the display 15B, so that the picture image based on the picture image data is displayed on the display 15B.

In this manner, the camera controller 20 displays the picture image that is generated by photographing the photographing object on the display 15B, so as to be shown to the user.

In addition, if the camera controller 20 is instructed to change the operation mode into the image providing mode, where the picture image data are provided to the photographing condition providing apparatus 3, for example, through the tapping manipulation on the touch panel 15A, the camera controller 20 operates in the image providing mode.

In the image providing mode, for example, the camera controller 20 reads the plurality of the thumbnail data from the recording device 34 and displays the plurality of the thumbnail data on the display 15B similarly to the aforementioned reproduction mode.

In this state, if the thumbnail generated by photographing the non-human object is selected among the plurality of the thumbnails through the tapping manipulation or the like, the camera controller 20 reads the image file corresponding to the selected thumbnail from the recording device 34.

In other words, the camera controller 20 reads the image file generated by photographing the non-human object corresponding to the selected thumbnail from the recording device 34 in response to the selection of the thumbnail generated by photographing the non-human object. In addition, in the hereinafter description, a image file generated by photographing the non-human object is referred to as a non-human object image file.

Next, the camera controller 20 transmits the non-human object image file to the photographing condition providing apparatus 3 on the network 4 through the communication processing unit 43 and the network interface 44 sequentially.

Therefore, the digital processing unit 31 not only receives the non-human object photographing conditions from the photographing condition providing apparatus 3 but also provides the non-human object image file to the photographing condition providing apparatus 3, so that the non-human object image file may be used for providing of the non-human object photographing conditions.

1-4. Circuit Configuration of Photographing Condition Providing Apparatus 3

Figure 9:
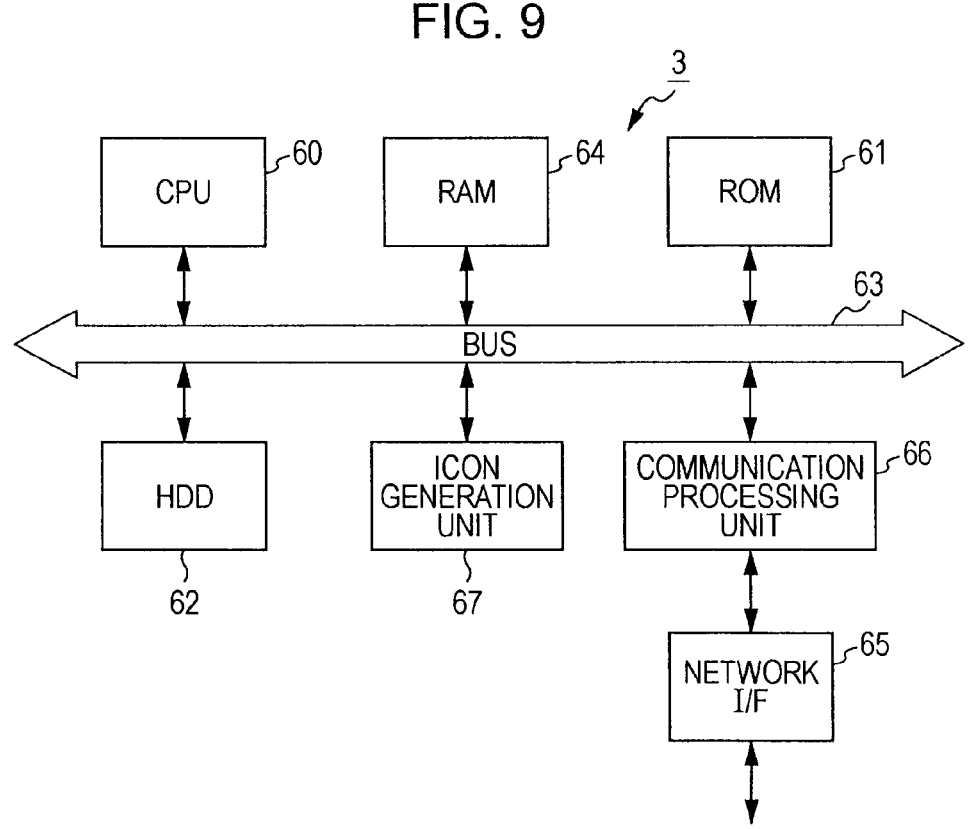
FIG. 9 is a block diagram illustrating a circuit configuration of a photographing condition providing apparatus.

Next, a circuit configuration of the photographing condition providing apparatus 3 is described with reference to FIG. 9. The photographing condition providing apparatus 3 includes a central processing unit 60. In the hereinafter description, the central processing unit 60 included in the photographing condition providing apparatus 3 is particularly referred to as a apparatus controller 60.

The apparatus controller 60 reads various programs, which are stored in a ROM 61 or a hard disc drive (HDD: Hard Disc Drive) 62 in advance, via a bus 63 and develops the programs on a RAM 64. Next, the apparatus controller 60 controls the entire photographing condition providing apparatus 3 according to the various programs developed on the RAM 64 and executes various processes.

In this case, the apparatus controller 60 configures database (hereinafter, referred to as condition searching database) for searching for the non-human object photographing conditions in the hard disc drive 62 in advance. For example, a number of pieces of the non-human object identification information, which may individually identify a number of non-human objects such as relatively famous artificial objects (buildings or exhibited objects) or natural objects (sceneries of mountains, rivers, or seas) in each place are registered in the condition searching database.

In addition, the non-human object identification information is generated, for example, as numerals sequentially allocated to the non-human objects in order to distinguish the non-human objects from other non-human objects but not to explicitly specify the non-human objects like the names of the non-human objects. In addition, the location information indicating the location (position expressed by latitude and longitude) of the non-human object is registered in correspondence with the non-human object identification information of the non-human object in the condition searching database.

Next, if the non-human object image file is transmitted from the digital still camera 2, the apparatus controller 60 receives the non-human object image file through the network interface 65 and the communication processing unit 66 sequentially.

If the non-human object image file is received, the apparatus controller 60 starts to extract the compressed image data and the header data from the non-human object image file and transmits the extracted compressed image data to the icon generation unit 67.

In addition, the apparatus controller 60 extracts the photographing position information, the photographing direction information, and the condition setting information from the header data. In addition, the apparatus controller 60 sets a searching range for searching for the non-human object, which may be photographed at the photographing position in the photographing direction, by using the photographing position and the photographing direction indicated by the photographing position information and the photographing direction information. For example, the apparatus controller 60 sets a linear range, which gradually spreads from the photographing position as a central point in the photographing direction with a predetermined radius and a predetermined central angle, as the searching range.

In addition, the apparatus controller 60 sequentially compares the searching range with the locations indicated by the plurality of the pieces of the location information in the condition searching database to detect the location information indicating the locations within the searching range.

Next, the apparatus controller 60 specifies the non-human object identification information, which is in correspondence with the detected location information, as the non-human object identification information which identifies the non-human object photographed at the photographing position in the photographing direction.

If the compressed image data are input from the apparatus controller 60, the icon generation unit 67 applies the decompression decoding process on the compressed image data to generate the original picture image data. In addition, the icon generation unit 67 applies the reduction process for culling the pixels on the picture image data to generate non-human object photographing condition icons that are configured as the thumbnails.

In addition, at this time, the icon generation unit 67 extracts from the entire of the picture image based on the picture image data, for example, shapes of a plurality of contours, a position relationship between the plurality of the contours, colors, and the like as a image feature amount (hereinafter, referred to as a picture image feature amount). Next, the icon generation unit 67 transmits the non-human object photographing condition icon and the picture image feature amount to the apparatus controller 60.

If the non-human object photographing condition icon and the picture image feature amount are input from the icon generation unit 67, the apparatus controller 60 collectively sets the non-human object photographing condition icon, the picture image feature amount, and the condition setting information extracted from the header data as condition registration information.

Next, the apparatus controller 60 stores the condition registration information in the hard disc drive 62 and registers the condition registration information in correspondence with the specified non-human object identification information in the condition searching database.

In this manner, the apparatus controller 60 generates the condition registration information based on the non-human object image files transmitted from a number of digital still cameras and classifies the condition registration information as the non-human object identification information to be registered in condition searching database and to be tracked.

On the other hand, if the query signal is transmitted from the digital still camera 2, the apparatus controller 60 receives the query signal through the network interface 65 and the communication processing unit 66 sequentially. At this time, the apparatus controller 60 extracts the camera position information and the camera direction information from the query signal.

In addition, the apparatus controller 60 sets a searching range for searching the non-human object, which may be photographed at the camera position in the camera direction, by using the camera position and the camera direction indicated by the camera position information and the camera direction information. For example, at this time, as described above, the apparatus controller 60 sets a linear range, which gradually spreads from the camera position as a central point in the camera direction with a predetermined radius and a predetermined central angle, as the searching range.

In addition, the apparatus controller 60 sequentially compares the searching range with the locations indicated by the plurality of the pieces of the location information in the condition searching database to detect the location information indicating the locations within the searching range.

Next, the apparatus controller 60 specifies the non-human object identification information, which is in correspondence with the detected location information, in the condition searching database. In addition, the apparatus controller 60 determines whether or not a predetermined number or more of pieces of the previously-selected condition registration information have already been registered in correspondence with the specified non-human object identification information in the condition searching database.

As a result, if a predetermined number or more of the pieces of the condition registration information have already been in correspondence with the specified non-human object identification information, although the non-human object photographing conditions indicated by the condition registration information are strictly selected for the providing, the apparatus controller 60 determines that the previously-selected number of the non-human object photographing conditions may be acquired for the providing. In other words, at this time, the apparatus controller 20 determines that the plurality of non-human object photographing conditions may be recommended.

If the plurality of non-human object photographing conditions are determined not to be recommended in this manner, the apparatus controller 60 generates a providable notice signal into which the specified non-human object identification information is inserted. In addition, the apparatus controller 60 transmits the providable notice signal to the digital still camera 2 through the communication processing unit 66 and the network interface 65 sequentially.

Next, as a result of replay of the providable notice signal to the digital still camera 2, if a condition request signal is transmitted from the digital still camera 2, the apparatus controller 60 receives the condition request signal through the network interface 65 and the communication processing unit 66 sequentially.

If the condition request signal is received in this manner, the apparatus controller 60 extracts the non-human object identification information and the unit image feature amount from the received condition request signal. In addition, the apparatus controller 60 reads all the condition registration information in correspondence with non-human object identification information from the hard disc drive 762.

In addition, the apparatus controller 60 narrows the plurality of picture image feature amounts down to the picture image feature amounts of the picture images having compositions similar to that of the unit image, which the unit image feature amount is extracted from, based on the unit image feature amount and the picture image feature amounts included in each condition registration information.

In addition, the apparatus controller 60 selects an upper predetermined number of the picture image feature amounts of the picture images, of which a difference in a color tone, chroma, luminance, white balance, or the like from the unit image is large, among the narrowed-down picture image feature amounts.

If the plurality of the picture image feature amounts are selected in this manner, the apparatus controller 60 selects the non-human object photographing condition of the photographing at the time of obtaining the picture image having the picture image feature amounts as the non-human object photographing condition that is recommended to the user.

At this time, the apparatus controller 60 extracts the non-human object photographing condition icon for recommendation of the non-human object photographing condition from the condition registration information corresponding to the selected non-human object photographing condition (that is, including the selected picture image feature amount).

In addition, the apparatus controller 60 also extracts the condition setting information used to set the non-human object photographing condition from the condition registration information corresponding to the selected non-human object photographing condition (that is, including the selected picture image feature amount).

If the non-human object photographing condition icon and the condition setting information is extracted from each of the plurality of pieces of the condition registration information, the apparatus controller 60 generates the condition providing signal, into which the non-human object photographing condition icon and the condition setting information are inserted in a correspondence manner, with respect to each of the non-human object photographing conditions.

If the condition providing signal is generated, the apparatus controller 60 transmits the generated condition providing signal to the digital still camera 2 through the communication processing unit 66 and the network interface 65 sequentially. Therefore, the apparatus controller 60 may recommend the plurality of the non-human object photographing conditions as the non-human object photographing condition icons to the user through the digital still camera 2.

In addition, although the non-human object identification information is specified as described above, if a predetermined number or more of pieces of the condition registration information is not registered in correspondence with the non-human object identification information, the apparatus controller 60 determines that a preset number of the non-human object photographing conditions may not be acquired for the purpose of the providing. In other words, at this time, the apparatus controller 20 determines that the plurality of the non-human object photographing conditions may not be recommended.

If the non-human object photographing condition is determined not to be recommended in this manner, the apparatus controller 60 generates a non-providable notice signal for notifying this fact. Next, the apparatus controller 60 transmits the non-providable notice signal to the digital still camera 2 through the communication processing unit 66 and the network interface 65 sequentially.

1-5. Photographing Condition Setting Process

Next, the photographing condition setting procedure performed by the digital still camera 2 and the photographing condition providing apparatus 3 is described with reference to FIGS. 10 and 11.

Figure 10:
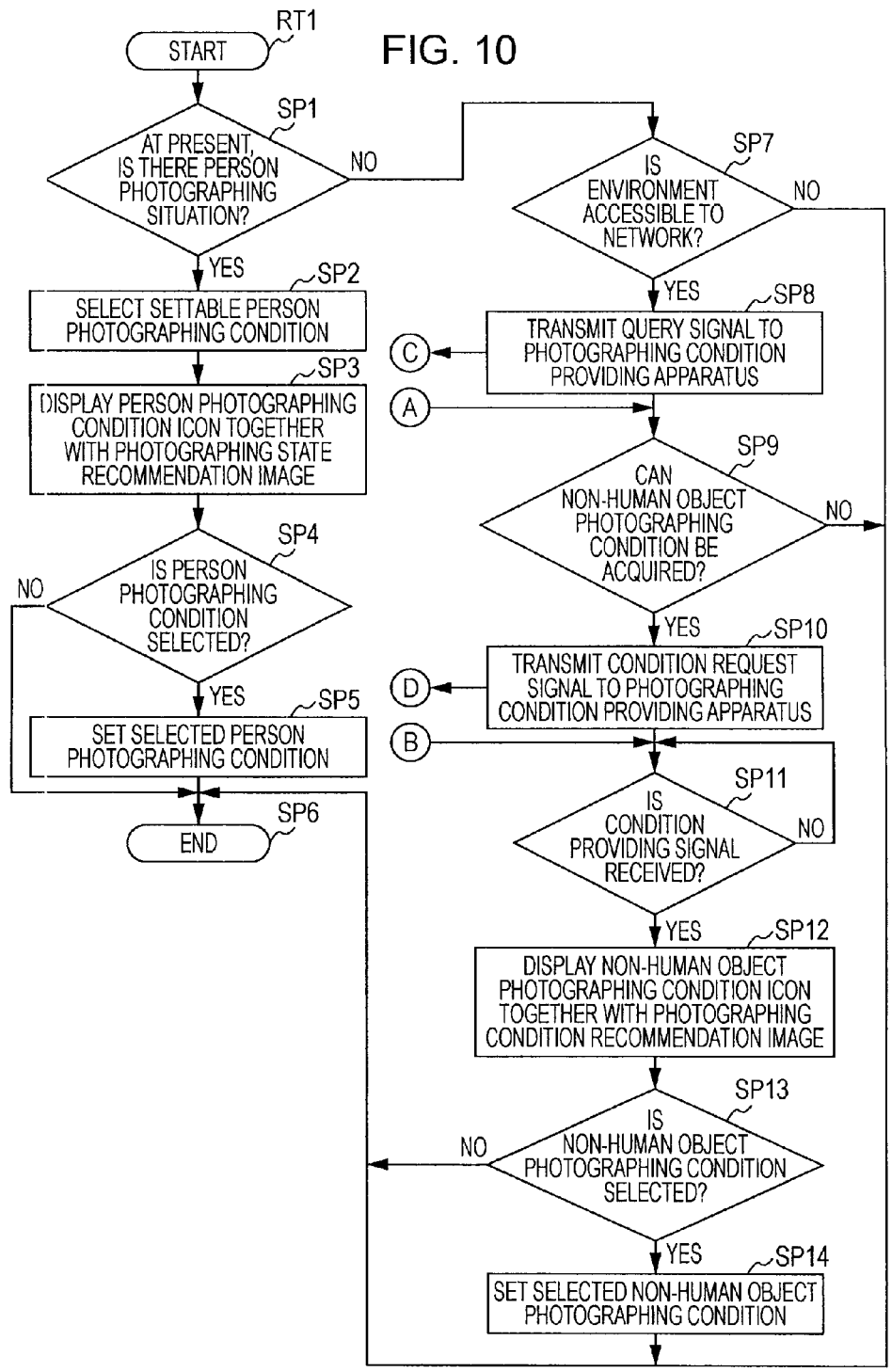
FIG. 10 is a flowchart illustrating a photographing condition setting procedure (1).

In the digital still camera 2, in the photographing mode, if the condition recommendation request command is input, the camera controller 20 starts the photographing condition recommendation setting procedure RT1 illustrated in (A) of FIG. 10 according to the photographing condition recommendation setting program stored in the ROM 21 in advance.

If the photographing condition recommendation setting procedure RT1 starts. In Step SP1, the camera controller 20 allows the digital processing unit 31 to execute the face detection process every time when the unit image data is generated and determines based on the execution result whether or not the current situation is the person photographing situation.

The affirmative result obtained in Step SP1 denotes that one or a plurality of persons are currently consecutively photographed for checking the photographing state. If the affirmative result is obtained in Step Sp1, the camera controller 20 determines that the current situation is the person photographing situation and proceeds to the next Step SP2.

In Step SP2, the camera controller 20 selects one or the plurality of the person photographing conditions that are settable for the current person photographing situation based on the face of the person detected by the digital processing unit 31 and proceeds to the next Step SP3.

In Step SP3, the camera controller 20 displays the person photographing condition icons 39 to 41 for recommending the selected person photographing condition overlappedly on the photographing state recommendation image 37 displayed on the display 15B and proceeds to the next Step SP4.

In Step SP4, the camera controller 20 determines whether or not the person photographing condition is selected through the person photographing condition icons 39 to 41 displayed on the display 15B. The affirmative result obtained in Step SP4 denotes that there exists a person photographing condition to be used for the person who is consecutively photographed at this time and the person photographing condition is selected. If the affirmative result is obtained in Step SP4, the camera controller 20 proceeds to the next Step SP5.

In Step SP5, the camera controller 20 sets the selected person photographing condition by using the corresponding condition setting information and proceeds to the next Step SP6. Therefore, in Step SP6, the camera controller 20 ends the photographing condition recommendation setting procedure RT1.

The negative result obtained in the aforementioned Step SP1 denotes that the non-human object is currently consecutively photographed for checking the photographing state. If the negative result is obtained in Step SP1, the camera controller 20 determines that the current situation is the non-human object photographing situation and proceeds to the next Step SP7.

In Step SP7, the camera controller 20 determines whether or not the digital still camera 2 is currently in an environment where the digital still camera 2 is accessible to the network 4. The affirmative result obtained in Step SP7 denotes that the non-human object is consecutively photographed for checking the photographing state in the communication area of the access point for the wireless LAN. If the affirmative result is obtained in Step SP7, the camera controller 20 proceeds to the next Step SP8.

In Step SP8, the camera controller 20 detects the current camera position and camera direction and generates the query signal containing the camera position information and the camera direction information indicating the detected camera position and camera direction. Next the camera controller 20 transmits the query signal to the photographing condition providing apparatus 3 through the communication processing unit 43 and the network interface 44 sequentially and proceeds to the next Step SP9.

Figure 11:
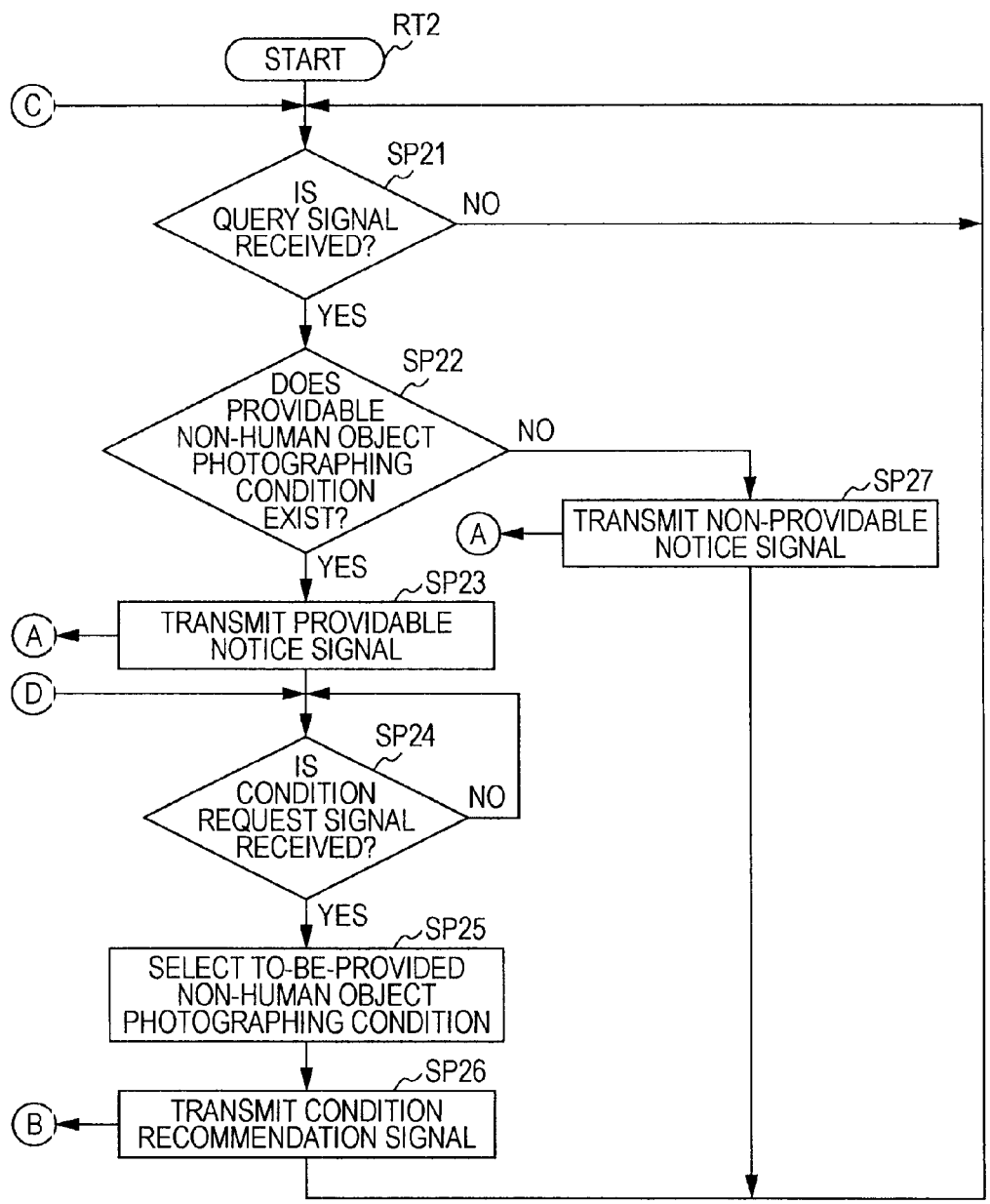
FIG. 11 is a flowchart illustrating a photographing condition setting procedure (2).

At this time, the apparatus controller 60 of the photographing condition providing apparatus 3 starts the photographing condition providing procedure RT2 illustrated in (B) of FIG. 11 according to the photographing condition providing program stored in the ROM 61 or the hard disc drive 62 in advance.

If the photographing condition providing procedure RT2 starts, in Step SP21, the apparatus controller 60 waits to receive the query signal transmitted from the digital still camera 2. Next, if the query signal transmitted from the digital still camera 2 is received through the network interface 65 and the communication processing unit 66 sequentially, the apparatus controller 60 proceeds to the next Step SP22.

In Step SP22, the apparatus controller 60 searches for the non-human object photographing condition providable to the digital still camera 2 in the condition searching database based on the current camera position and camera direction inserted into the query signal. Next, the apparatus controller 60 determines based on the searching result whether or not a providable non-human object photographing condition exists according to the current non-human object photographing situation of the digital still camera 2.

The affirmative result is obtained in Step SP22 denotes that the plurality of non-human object photographing conditions providable according to the current non-human object photographing situation of the digital still camera 2 are registered in the condition searching database in advance. If the affirmative result is obtained in Step SP22, the apparatus controller 60 proceeds to the next Step SP23.

Next, in Step SP23, the apparatus controller 60 generates the providable notice signal into which the non-human object identification information for specifying the non-human object photographing condition providable to the digital still camera 2 is inserted. Next, the apparatus controller 60 transmits the providable notice signal to the digital still camera 2 through the communication processing unit 66 and the network interface 65 sequentially and proceeds to the next Step SP24.

At this time, in Step SP9, the camera controller 20 receives the signal, which is transmitted from the photographing condition providing apparatus 3, through the network interface 44 and the communication processing unit 43 sequentially.

Next, the camera controller 20 determines based on the received signal whether or not the non-human object photographing condition may be acquired. At this time, if the providable notice signal transmitted from the photographing condition providing apparatus 3 is received, the camera controller 20 obtains the affirmative result and proceeds to the next Step SP10.

In Step SP10, the camera controller 20 allows the digital processing unit 31 to extract the unit image feature amount from the unit image which is generated at this time. In addition, the camera controller 20 extracts the non-human object identification information from the providable notice signal and generates the condition request signal into which the unit image feature amount together with the non-human object identification information is inserted.

Next, the camera controller 20 transmits the condition request signal to the photographing condition providing apparatus 3 through the communication processing unit 43 and the network interface 44 sequentially and proceeds to the next Step SP11.

At this time, in Step SP24, the apparatus controller 60 waits to receive the condition request signal transmitted from the digital still camera 2. Next, if the condition request signal transmitted from the digital still camera 2 is received through the network interface 65 and the communication processing unit 66 sequentially, the apparatus controller 60 proceeds to the next Step SP25.

In Step SP25, the apparatus controller 60 extracts the non-human object identification information and the unit image feature amount from the condition request signal and reads the plurality of pieces of the condition registration information identified by the non-human object identification information from the condition searching database.

In addition, the apparatus controller 60 selects the plurality of the non-human object photographing conditions provided to the digital still camera 2 based on the unit image feature amount and the picture image feature amount included in the plurality of pieces of the condition registration information and proceeds to the next Step SP26.

In Step SP26, the apparatus controller 60 extracts from the condition registration information the non-human object photographing condition icon for recommending the selected the non-human object photographing condition and the condition setting information used for setting the non-human object photographing condition. The apparatus controller 60 generates the condition providing signal into which the non-human object photographing condition icon and the condition setting information with respect to each of the selected the non-human object photographing conditions are inserted in correspondence manner.

Next, the apparatus controller 60 transmits the condition providing signal to the digital still camera 2 through the communication processing unit 66 and the network interface 65 sequentially and proceeds to the next Step SP21.

At this time, in Step SP11, the camera controller 20 waits to receive the condition providing signal transmitted from the photographing condition providing apparatus 3. Next, if the condition providing signal transmitted from the photographing condition providing apparatus 3 is received through the network interface 44 and the communication processing unit 43 sequentially, the camera controller 20 proceeds to the next Step SP12.

In Step SP12, the camera controller 20 extracts the plurality of sets of the non-human object photographing condition icons and the condition setting information from the condition providing signal. At this time, the camera controller 20 displays the non-human object photographing condition icons 48 to 51 overlappedly on the photographing state recommendation image 46 displayed on the display 15B and proceeds to the next Step SP13.

In Step SP13, the camera controller 20 determines whether or not the non-human object photographing condition is selected through the non-human object photographing condition icons 48 to 51 displayed on the display 15B.

The affirmative result obtained in Step SP13 denotes that there exists a non-human object photographing condition in favor of photographing the non-human object that is consecutively photographed at this time and the non-human object photographing condition is selected. If the affirmative result is obtained in Step SP13, the camera controller 20 proceeds to the next Step SP14.

In Step SP14, the camera controller 20 sets the selected non-human object photographing condition by using the corresponding condition setting information and proceeds to the next Step SP6. Therefore, in Step SP6, the camera controller 20 ends the photographing condition recommendation setting procedure RT1.

The negative result obtained in the aforementioned Step SP22 denotes that the non-human object photographing condition providable according to the current non-human object photographing situation of the digital still camera 2 is not yet registered in the condition searching database. If the negative result is obtained in Step SP22, the apparatus controller 60 proceeds to the Step SP27.

At this time, in Step SP27, the apparatus controller 60 generates the non-providable notice signal for noticing that there does not exist the non-human object photographing condition providable to the digital still camera 2. Next, the apparatus controller 60 transmits the non-providable notice signal to the digital still camera 2 through the communication processing unit 66 and the network interface 65 sequentially and returns to Step SP21.

In this manner, if the photographing condition providing procedure RT2 starts, the apparatus controller 60 waits to receive the query signal transmitted from the digital still camera 2. Every time when the query signal is received, the apparatus controller 60 executes the processes of Steps SP21 to SP27.

On the other hand, in Step SP9, if the non-providable notice signal as the signal transmitted from the photographing condition providing apparatus 3 is received through the network interface 44 and the communication processing unit 43 sequentially, the camera controller 20 obtains the negative result and proceeds to the Step SP6. Next, in Step SP6, the camera controller 20 stops the photographing condition recommendation setting process at this time and ends the photographing condition recommendation setting procedure RT1.

In addition, the negative result is obtained in the aforementioned Step SP4 denotes that there does not exist a person photographing condition that intends to be used for the person who is consecutively photographed. If the negative result is obtained in Step SP4, the camera controller 20 proceeds to Step SP6 to stop the photographing condition recommendation setting process at this time and end the photographing condition recommendation setting procedure RT1.

In addition, the negative result obtained in the aforementioned Step SP7 denotes that the non-human object is consecutively photographed for checking the photographing state at a position deviating from a communication area of an access point for a wireless LAN.

If the negative result is obtained in Step SP7, the camera controller 20 proceeds to Step SP6 to stop the photographing condition recommendation setting process at this time and end photographing condition recommendation setting procedure RT1.

In addition, the negative result obtained in the aforementioned Step SP13 denotes that there does not exist a non-human object photographing condition in favor of photographing the non-human object that is consecutively photographed at this time and the selection is not attempted. If the negative result is obtained in Step SP13, the camera controller 20 proceeds to Step SP6 to stop the photographing condition recommendation setting process at this time and end the photographing condition recommendation setting procedure RT1.

1-6. Operations and Effects of Embodiment

In the above configuration, in the photographing mode, if the photographing condition recommendation command is input, the digital still camera 2 executes the face detection process every time when the unit image data are sequentially generated. If the face of the person is detection the unit image by the face detection process sequentially executed, the digital still camera 2 determines to be currently in the person photographing situation. At this time, the digital still camera 2 sets the person photographing condition settable for photographing the person by individually applying to the person detected in the unit image.

Next, the digital still camera 2 displays the photographing state recommendation image 37 on the display 15B and displays the person photographing condition icons 39 to 41 for recommending the selected person photographing condition overlappedly on the photographing state recommendation image 37.

If the person photographing condition is selected as the person photographing condition icons 39 to 41 displayed on the display 15B in this manner, the digital still camera 2 sets the selected person photographing condition by using the corresponding condition setting information.

On the other hand, if any face of persons is not detected in the unit image by the sequentially executed face detection process, the digital still camera 2 determines that the current situation is a non-human object photographing situation. At this time, the digital still camera 2 requests the photographing condition providing apparatus 3 for the non-human object photographing condition settable for photographing the non-human object that may be photographed in the current camera position and camera direction.

As a result, if the plurality of the non-human object photographing condition icons 48 to 51 for recommending the non-human object photographing condition and the condition setting information used for setting the non-human object photographing condition are provided from the photographing condition providing apparatus 3, the digital still camera 2 acquires the non-human object photographing condition icons 48 to 51 and the condition setting information.

Next, the digital still camera 2 displays the photographing state recommendation image 46 on the display 15B and displays the acquired non-human object photographing condition icons 48 to 51 overlappedly on the photographing state recommendation image 46.

If the non-human object photographing condition is selected as the non-human object photographing condition icons 48 to 51 displayed on the display 15B in this manner, the digital still camera 2 sets the selected non-human object photographing condition by using the corresponding condition setting information.

Therefore, the digital still camera 2 may allows the person photographing condition or the non-human object photographing condition suitable for the person photographing situation or the non-human object photographing situation to be selected according to the current person photographing situation or the current non-human object photographing situation.

According to the above configurations, in the photographing mode, the digital still camera 2 determines based on the photographing state recommendation images 37 and 46, which are obtained by consecutively photographing the photographing object for checking the photographing state, whether the current photographing situation is the person photographing situation or the non-human object photographing situation and displays the person photographing condition icons 39 to 41 or the non-human object photographing condition icons 48 to 51 for recommending the photographing condition settable to the determined person photographing situation or non-human object photographing situation. Therefore, the digital still camera 2 may allow the photographing condition suitable for the photographing situation to be selected according to the photographing situation. Accordingly, the digital still camera 2 allows the desired photographing condition suitable for the photographing situation to be appropriately selected.

In addition, the digital still camera 2 allows the person photographing condition icons 39 to 41 or the non-human object photographing condition icons 48 to 51 indicating the selectable person photographing condition or non-human object photographing condition to be displayed overlappedly on the photographing state recommendation images 37 and 46 displayed on the display 15B.

Therefore, the digital still camera 2 allows the desired person photographing condition or non-human object photographing condition to be selected through the person photographing condition icons 39 to 41 or the non-human object photographing condition icons 48 to 51 while allowing the photographing state of the photographing object to be checked through the photographing state recommendation images 37 and 46.

In addition, the digital still camera 2 display on the display 15B the plurality of the person photographing condition icons 39 to 41 or the plurality of the non-human object photographing condition icons 48 to 51 to be aligned in a row. Therefore, in the case where there exist the plurality of the settable person photographing conditions or the plurality of the settable non-human object photographing conditions, digital still camera 2 may allow these photographing conditions to be easily checked.

In addition, when the person photographing condition icons 39 to 41 is displayed, the digital still camera 2 allow the person photographing condition icons 39 to 41 indicating the person photographing conditions to be dragged on to the face of the person, to which the person photographing conditions are applied, so that the person photographing conditions and the person are combined and selected. Therefore, the digital still camera 2 may simplify the manipulation for combining and selecting the person and the person photographing condition.

In addition, at this time, if the display form is requested to be changed, the digital still camera 2 is configured to display the person photographing condition icons 39 to 41 on the photographing state recommendation image 37 to be in the vicinity of the face of the person, to which the person photographing condition indicated by the person photographing condition icon is applied. Therefore, the digital still camera 2 may allows the combination of the person photographing condition and the person, to which the person photographing condition may be applied, to be easily recognized on the photographing state recommendation image 37.

In addition, at this time, the digital still camera 2 allows only the person photographing condition icons 39 to 41 to be indicated, so that the person photographing condition indicated by the person photographing condition icons 39 to 41 and the person of which the face is in the vicinity of the person photographing condition icons 39 to 41 may be allowed to be combined and selected. Therefore, the digital still camera 2 may further simplify the manipulation for combining and selecting the person and the person photographing condition.

2. MODIFIED EXAMPLES

2-1. Modified Example 1

In the aforementioned embodiments, the description has been made on the case where, when the situation is determined to be a person photographing situation, various person photographing conditions that may be individually applied and set to persons are allowed to be selected.

However, the invention is not limited thereto, but when the situation is determined to be the person photographing situation, a person photographing condition that is uniformly applied to all of the plurality of the to-be-photographed persons, a person photographing condition that is applied to the entire picture image, and a person photographing condition which is applied to a predetermined ratio or more of the person among the plurality of the persons may be selected.

As the person photographing condition that is uniformly applied to all the to-be-photographed persons, there is prevention of a red eye effect when the photographing is performed by using a flash or focus adjustment for clarifying all the contours of the person.

In addition, as the person photographing condition that is applied to the entire picture image, when the photographing is performed by using the flash, the background together with the person may be photographed nicely by preventing the background of the person from being blackened, or the person and the background may be clearly shown even in the backlightening.

In addition, as the person photographing condition which is applied to a predetermined ratio or more of the person among the plurality of the persons, the photographing may be automatically performed when the predetermined ratio or more of the persons show smile faces or when the person faces the photographing lens 11.

2-2. Modified Example 2

In addition, in the aforementioned embodiments, the description has been made on the case where, in the photographing condition recommendation setting process, the person photographing condition icons 39 to 41 or the non-human object photographing condition icons 48 to 51 together with the photographing state recommendation images 37 and 46 are displayed on the display 15B.

However, the invention is not limited thereto, but in the photographing condition recommendation setting process, the photographing state recommendation images 37 and 46 are not displayed on the display 15B, and only the person photographing condition icons 39 to 41 or only the non-human object photographing condition icons 48 to 51 may be displayed.

In addition, in the invention, in the case where, in the photographing condition recommendation setting process, only the person photographing condition icons 39 to 41 or only the non-human object photographing condition icons 48 to 51 are displayed on the display 15B, these icons may be listed and displayed in a matrix form.

In addition, in the invention, in the photographing condition recommendation setting process, the photographing state recommendation images 37 and 46 are displayed on the display 15B in a whole-direction reduction form or in an image-horizontal-direction or image-vertical-direction reduction form. In addition, in the invention, in an empty region that is formed due to the reduction or the reduced display, the person photographing condition icons 39 to 41 or the non-human object photographing condition icons 48 to 51 may be displayed to be aligned in a row or in a plurality of rows in the vertical or horizontal direction.

2-3. Modified Example 3

In addition, in the aforementioned embodiments, the description has been made on the case where, when the situation is determined to be a person photographing situation, a plurality of the person photographing condition icons 39 to 41 are displayed in a row, and the person photographing condition icons 39 to 41 are displayed in the vicinity of the face of the person according to the display form changing indication.

However, the invention is not limited thereto, but when the situation is determined to be the person photographing situation, instead of displaying the plurality of person photographing condition icons 39 to 41 in a row, the person photographing condition icons 39 to 41 may be displayed only in the vicinity of the face of the person from the starting point of the display.

According to the invention, without indication of change in the display format, it is possible to allow a combination of the person photographing condition icons 39 to 41 and the person, to which the person photographing conditions indicated by the person photographing condition icons 39 to 41 are settable, to be recognized.

2-4. Modified Example 4

In addition, in the aforementioned embodiments, the description has been made on the case where the photographing objects are divided into two types, that is, the person and the non-human object for determination of the photographing situation. However, the invention is not limited thereto, but the non-human object other than the person may be further subdivided and for determination of the photographing situation.

In the invention, in the case where the non-human objects are subdivided, it is detected by using various image feature amounts, for example, of vehicles, animals, insects, plants, or the like as comparison reference similarly to the aforementioned face feature amount whether or not these objects are shown in the unit image.

Therefore, according to the invention, it may be determined that the current photographing situation is the photographing situation for photographing vehicles (cars, electric trains, airplanes or the like), animal (dogs, cats, tigers, or the like), insects (unicorn beetles, stag beetles, butterflies, or the like), or the like as the photographing object.

2-5. Modified Example 5

In addition, in the aforementioned embodiments, the description has been made on the case where, when the situation is determined to be a non-human object photographing situation, the condition setting information is acquired through the non-human object photographing condition icons 48 to 51 from the photographing condition providing apparatus 3 on the network 4.

However, the invention is not limited thereto, but if the situation is determined to be the non-human object photographing situation in a sightseeing place or the like, the non-human object photographing condition icons and the condition setting information may be acquired from other digital still cameras, digital video cameras, or the like that exist around the user.

2-6. Modified Example 6

In addition, in the aforementioned embodiments, the description has been made on the case where the photographing condition setting apparatus according to the invention is adapted to the digital still camera 2 described above with reference to FIGS. 1 to 11. However, the invention is not limited thereto, but it may be adapted to information process apparatuses such as a computer, a mobile phone, a PDA (Personal Digital Assistance), or a mobile game machine, which have a photographing function. In addition, the invention may also be adapted to the photographing condition setting apparatuses having various configurations such as a digital video camera having a photographing function.

2-7. Modified Example 7

In addition, in the aforementioned embodiments, the photographing condition setting program according to the invention is adapted to the photographing condition recommendation setting program, which is stored in the ROM 21 in advance, described above with reference to FIGS. 1 to 11. In addition, the description has been made on the case where the camera controller 20 allows the photographing condition recommendation setting procedure RT1 described above with reference to FIGS. 10 and 11 to be executed according to the photographing condition recommendation setting program.

However, the invention is not limited thereto, but the digital still camera 2 may install the photographing condition setting program through a computer-readable recording medium on which the photographing condition setting program is recorded. In addition, the camera controller 20 may execute the photographing condition recommendation setting procedure RT1 according to the installed photographing condition setting program.

In addition, the digital still camera 2 may install the photographing condition setting program provided from an external portion by using a local area network or the Internet, or a wired and radio communication media such as digital satellite broadcast.

In addition, the computer-readable recording medium which is used to allow the photographing condition setting program to be installed digital still camera 2 and to be in the executable state may be implemented with, for example, a package media such as a flexible disk.

In addition, the computer-readable recording medium which is used to allow the photographing condition setting program to be installed digital still camera 2 and to be in the executable state may be implemented with, for example, a package media such as a CD-ROM (Compact Disc-Read Only Memory).

In addition, the computer-readable recording medium which is used to allow the photographing condition setting program to be installed digital still camera 2 and to be in the executable state may be implemented with, for example, a package media such as a DVD (Digital Versatile Disc).

In addition, such a computer-readable recording medium may be implemented with a semiconductor memory, a magnetic disc, or the like on which various programs are temporarily or permanently recorded as well as the package media.

In addition, a local area network or the Internet, or a wired and radio communication media such as digital satellite broadcast may be used as a means for recording the photographing condition setting program in the computer-readable recording medium. In addition, the photographing condition setting program may be recorded in the computer-readable recording medium through various types of communication interface such as a router or a modem.

2-8. Modified Example 8

In addition, in the aforementioned embodiments, the description has been made on the case where the display 15B configured with the liquid crystal display described above with reference to FIGS. 1 to 11 is used as the display unit. However, the invention is not limited thereto, but it may be widely adapted to various display units such as an organic EL (Electro Luminescence).

2-9. Modified Example 9

In addition, in the aforementioned embodiments, the description has been made on the case where the lens unit 26, the image capturing device 27, the analog processing unit 28, the analog-digital converter 30, and the digital processing unit 31 described above with reference to FIGS. 1 to 11 are used as the image capturing unit for generating the image data by capturing the photographing object. However, the invention is not limited thereto, but it may be widely adapted to image capturing units having various configurations.

2-10. Modified Example 10

In addition, in the aforementioned embodiments, the description has been made on the case where the digital processing unit 31 and the camera controller 20 described above with reference to FIGS. 1 to 11 are used as the photographing situation determination unit which determines based on the image data generated by the image capturing unit which type of the photographing object is photographed in a photographing situation.

However, the invention is not limited thereto, but the photographing situation determination unit may be adapted to a microprocessor or a DSP (Digital Signal Processor). In addition, the invention may be widely adapted to the photographing situation determination units having various configurations such as a photographing situation determination circuit having a hardware circuit configuration which determines based on the image data generated by the image capturing unit which type of the photographing object is photographed in a photographing situation.

2-11. Modified Example 11

In addition, in the aforementioned embodiments, the description has been made on the case where the camera controller 20 described above with reference to FIGS. 1 to 11 is used as the display controller which, if the photographing situation is determined by the photographing situation determination unit, allows one or a plurality of the photographing condition icons indicating the photographing conditions settable to the determined photographing situation to be displayed on the display unit.

However, the invention is not limited thereto, but the display controller may be adapted to a microprocessor or a DSP. In addition, the invention may be widely adapted to the display controllers having various configurations such as a display control circuit having a hardware circuit configuration which, if the photographing situation is determined by the photographing situation determination unit, allows one or a plurality of the photographing condition icons indicating the photographing conditions settable to the determined photographing situation to be displayed on the display unit.

2-12. Modified Example 12

In addition, in the aforementioned embodiments, the description has been made on the case where the digital processing unit 31 described above with reference to FIGS. 1 to 11 is used as the face detection unit which detects the face of the person, which is shown in the image based on the image data, based on the image data generated by the image capturing unit.

However, the invention is not limited thereto, but the face detection unit may be adapted to a microprocessor or a DSP. In addition, the invention may be widely adapted to the face detection units having various configurations such as a face detection circuit having a hardware circuit configuration which detects the face of the person, which is shown in the image based on the image data, based on the image data generated by the image capturing unit.

2-13. Modified Example 13

In addition, in the aforementioned embodiments, the description has been made on the case where the camera controller 20 described above with reference to FIGS. 1 to 11 is used as the determination unit which determines that the situation is the photographing situation where a person as a photographing object is photographed if the face of the person is detected to be shown in the image by the face detection unit and which determines that the situation is the photographing situation where a non-human object other than a person as a photographing object is photographed if the face of the person is not detected to be shown in the image by the face detection unit.

However, the invention is not limited thereto, but it may be adapted to a microprocessor or a DSP. In addition, the invention may be widely adapted to the determination units having various configurations such as a determination circuit having a hardware circuit configuration which determines that the situation is the photographing situation where a person as a photographing object is photographed if the face of the person is detected to be shown in the image by the face detection unit and which determines that the situation is the photographing situation where a non-human object other than a person as a photographing object is photographed if the face of the person is not detected to be shown in the image by the face detection unit.

2-14. Modified Example 14

In addition, in the aforementioned embodiments, the description has been made on the case where the touch panel 15A described above with reference to FIGS. 1 to 11 is used as the change indication unit which is used to indicate the change of the display form of the plurality of person photographing condition icons displayed on the display unit.

However, the invention is not limited thereto, but it may be widely adapted to various change indication units such as a pointing device like a joystick or a hardware key which a pressing manipulation or a sliding manipulation may be performed on.

2-15. Modified Example 15

In addition, in the aforementioned embodiments, the description has been made on the case where the touch panel 15A described above with reference to FIGS. 1 to 11 is used as the icon indication unit which is used to indicate the photographing condition icon displayed on the display unit. However, the invention is not limited thereto, but it may be widely adapted to various icon indication units such as a pointing device like a joystick.

2-16. Modified Example 16

In addition, in the aforementioned embodiments, the description has been made on the case where the camera controller 20 described above with reference to FIGS. 1 to 11 is used as the setting unit which, if the photographing condition icon is indicated through the icon indication unit, sets the photographing condition indicated by the indicated photographing condition icon.

However, the invention is not limited thereto, but it may be adapted to a microprocessor or a DSP. In addition, the invention may be widely adapted to the setting units having various configurations such as a setting circuit having a hardware circuit configuration which, if the photographing condition icon is indicated through the icon indication unit, sets the photographing condition indicated by the indicated photographing condition icon.

The present application contains subject matter related to that disclosed in Japanese Priority Patent Application JP 2009-200160 filed in the Japan Patent Office on Aug. 31, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   an image capturing unit which generates image data by capturing a photographing object;
   a display configured to display the image data generated by the image capturing unit;
   circuitry configured to
      detect a face of a person based on the image data generated by the image capturing unit;
      determine that a photographing situation is a situation where the person is photographed as the photographing object when the face of the person is detected; and
      control the display to display a plurality of person photographing condition icons indicating a photographing condition settable for photographing the person when the determined photographing situation is the situation where the person is photographed; and
   a user interface configured to receive an input indicating a change of a display form of the displayed plurality of person photographing condition icons, wherein
   the circuitry is configured to control the display to display a person image when the situation is the photographing situation where the person is photographed and, if a change of the display form is received via the user interface in a state where the plurality of the person photographing condition icons are displayed in a row overlappedly on the person image, control the display to display the plurality of the person photographing condition icons in the vicinity of the face of the person to whom the photographing condition indicated by each of the person photographing condition icons is applied.

2. The information processing apparatus according to claim 1, wherein the circuitry is configured to:
   determine that the photographing situation is a situation where a non-human object other than the person is photographed as a photographing object if the face of the person is not detected; and
   control the display to display a non-human object photographing condition icon indicating a photographing condition for photographing the non-human object when it is determined that the situation is the photographing situation where the non-human object is photographed.

3. The information processing apparatus according to claim 2, wherein the circuitry is configured to:

control the display to display the person image, on which the face of the person is shown as the image based on the image data and display the person photographing condition icons indicating the photographing conditions which may be individually applied to the person when it is determined that the situation is the photographing situation where the person is photographed; and control the display to display a non-human object image, on which the non-human object is shown as the image based on the image data and display the non-human object photographing condition icon when it is determined that the situation is the photographing situation where the non-human object is photographed.

4. The information processing apparatus according to claim 2, wherein the circuitry is configured to:

control the display to display the person image on the display and display the plurality of person photographing condition icons in a row overlappedly on the person image when it is determined that the situation is the photographing situation where the person is photographed; and control the display to display the non-human object image and a plurality of the non-human object photographing condition icons in a row overlappedly on the non-human object image when it is determined that the situation is the photographing situation where the non-human object is photographed.

5. The information processing apparatus according to claim 2, wherein the circuitry is configured to:

detect the face of the person together with a type of the person based on the image data generated by the image capturing unit; and control the display to display the person image and the plurality of person photographing condition icons indicating photographing conditions which may be individually applied to the person in a row overlappedly on the person image according to the type of the person when it is determined that the situation is the photographing situation where the person is photographed.

6. An information processing apparatus comprising:

an image capturing unit which generates image data by capturing a photographing object, a display configured to display the image data generated by the image capturing unit;

circuitry configured to detect a face of a person based on the image data generated by the image capturing unit;

determine that a photographing situation is a situation where the person is photographed as the photographing object when the face of the person is detected; and control the display to display a plurality of person photographing condition icons indicating a photographing condition settable for photographing the person when the determined photographing situation is the situation where the person is photographed;

receive an input selecting at least one of the displayed plurality of person photographing condition icons; and set a photographing condition corresponding to the selected at least one of the plurality of person photographing condition icons, wherein in the case where the circuitry allows a person image to the displayed on the display and allows the plurality of person photographing condition icons to be displayed in a row overlappedly on the person image, if the person photographing condition icons and faces of the persons to whom the photographing conditions indicated by the person photographing condition icons are applied are selected by the received input, the circuitry applies and sets the photographing condition corresponding to the selected person photographing condition icon to the indicated person, in the case where the circuitry allows the person image to be displayed on the display and allows the plurality of the person photographing condition icons to be displayed in a row overlappedly on the person image, the circuitry allows the person photographing condition icon selected by the received input to be moved on the person image in response to a manipulation on the icon, and in the case where the circuitry allows the person image to be displayed on the display and allows the plurality of the person photographing condition icons to be displayed in a row overlappedly on the person image, if the person photographing condition icon selected by the received input is moved so as to be overlapped on the face of the person in response to a manipulation on the icon, the circuitry applies and sets the photographing condition selected by the received input to the person on which the person photographing condition icon is overlapped.

7. An information processing apparatus comprising:

an image capturing unit which generates image data by capturing a photographing object;

a display configured to display the image data generated by the image capturing unit;

circuitry configured to detect a face of a person based on the image data generated by the image capturing unit;

determine that a photographing situation is a situation where the person is photographed as the photographing object when the face of the person is detected; and control the display to display a plurality of person photographing condition icons indicating a photographing condition settable for photographing the person when the determined photographing situation is the situation where the person is photographed;

receive an input selecting at least one of the displayed plurality of person photographing condition icons; and set a photographing condition corresponding to the selected at least one of the plurality of person photographing condition icons, wherein in the case where the circuitry allows a person image to be displayed on the display and allows the plurality of person photographing condition icons to be displayed in a row overlappedly on the person image, if the person photographing condition icons and faces of the persons to whom the photographing conditions indicated by the person photographing condition icons are applied are selected by the received input, the circuitry applies and sets the photographing condition corresponding to the selected person photographing condition icon to the indicated person, and in the case where the circuitry allows the person image to be displayed on the display and allows the plurality of the person photographing condition icons to be displayed on the person image in the vicinity of the face of the person to which the photographing condition indicated by each of the person photographing condition icons is applied, if the person photographing condition icon is selected by the received input, the circuitry applies and sets the photographing condition corresponding to the selected person photographing condition icon to the person whose face is in the vicinity of the indicated person photographing condition icon.

8. A photographing condition setting method comprising:
generating image data by capturing a photographing object;
displaying the image data generated by capturing the photographing object;
detecting a face of a person based on the generated image data;
determining that a photographing situation is a situation where the person is photographed as the photographing object when the face of the person is detected;
displaying a plurality of person photographing condition icons indicating photographing conditions settable for photographing the person when the determined photographing situation is the situation where the person is to be photographed;
receiving an input indicating a change of a display form of the displayed plurality of person photographing condition icons;
displaying a person image when the situation is the photographing situation where the person is photographed; and
if a change of the display form is received in a state where the plurality of the person photographing condition icons are displayed in a row overlappedly on the person image, displaying the plurality of the person photographing condition icons in the vicinity of the face of the person to whom the photographing condition indicated by each of the person photographing condition icons is applied.

9. A non-transitory computer-readable medium including computer-program instructions, which when executed by an information processing apparatus, cause the information processing apparatus to execute:
generating image data by capturing a photographing object;
displaying the image data generated by capturing the photographing object;
detecting a face of a person based on the generated image data;
determining that a photographing situation is a situation where the person is photographed as the photographing object when the face of the person is detected;
displaying a plurality of person photographing condition icons indicating photographing conditions settable for photographing the person when the determined photographing situation is the situation where the person is to be photographed;
receiving an input indicating a change of a display form of the displayed plurality of person photographing condition icons;
displaying a person image when the situation is the photographing situation where the person is photographed; and
if a change of the display form is received in a state where the plurality of the person photographing condition icons are displayed in a row overlappedly on the person image, displaying the plurality of the person photographing condition icons in the vicinity of the face of the person to whom the photographing condition indicated by each of the person photographing condition icons is applied.

* * * * *